(12) United States Patent
Hofmann

(10) Patent No.: US 11,773,475 B2
(45) Date of Patent: *Oct. 3, 2023

(54) HIGH TOUGHNESS METALLIC GLASS-BASED COMPOSITES FOR ADDITIVE MANUFACTURING

(71) Applicant: California Institute of Technology, Pasadena, CA (US)

(72) Inventor: Douglas C. Hofmann, Altadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/405,836

(22) Filed: Aug. 18, 2021

(65) Prior Publication Data

US 2021/0379661 A1 Dec. 9, 2021

Related U.S. Application Data

(63) Continuation of application No. 15/996,913, filed on Jun. 4, 2018, now Pat. No. 11,123,797.

(60) Provisional application No. 62/514,653, filed on Jun. 2, 2017.

(51) Int. Cl.
| | |
|---|---|
| *C22C 33/02* | (2006.01) |
| *B22F 10/10* | (2021.01) |
| *C22C 16/00* | (2006.01) |
| *B33Y 80/00* | (2015.01) |
| *C22C 38/02* | (2006.01) |
| *C22C 38/00* | (2006.01) |
| *B23K 26/00* | (2014.01) |
| *B23K 26/342* | (2014.01) |
| *C22C 38/12* | (2006.01) |
| *B33Y 70/10* | (2020.01) |
| *B33Y 40/10* | (2020.01) |
| *B22F 10/14* | (2021.01) |
| *B22F 10/25* | (2021.01) |
| *B22F 10/28* | (2021.01) |
| *B22F 10/38* | (2021.01) |
| *B22F 10/66* | (2021.01) |
| *C22C 1/04* | (2023.01) |

(52) U.S. Cl.
CPC .......... *C22C 33/0278* (2013.01); *B22F 10/10* (2021.01); *B22F 10/14* (2021.01); *B22F 10/25* (2021.01); *B22F 10/28* (2021.01); *B22F 10/38* (2021.01); *B22F 10/66* (2021.01); *B23K 26/0093* (2013.01); *B23K 26/342* (2015.10); *B33Y 40/10* (2020.01); *B33Y 70/10* (2020.01); *B33Y 80/00* (2014.12); *C22C 16/00* (2013.01); *C22C 38/002* (2013.01); *C22C 38/02* (2013.01); *C22C 38/12* (2013.01); *B22F 2301/205* (2013.01); *B22F 2999/00* (2013.01); *C22C 1/0458* (2013.01)

(58) Field of Classification Search
CPC .......... B22F 10/10; B22F 10/14; B22F 10/20; B22F 10/25; B22F 10/28; B22F 10/38; B22F 10/66; B22F 2301/205; B22F 2999/00; B23K 26/0093; B23K 26/342; B33Y 10/00; B33Y 40/10; B33Y 70/00; B33Y 70/10; B33Y 80/00; Y02P 10/25; C22C 1/0458; C22C 16/00; C22C 2200/02; C22C 33/0278; C22C 38/002; C22C 38/02; C22C 38/12

See application file for complete search history.

(56) References Cited

U.S. PATENT DOCUMENTS

| | | |
|---|---|---|
| 2,190,492 A | 2/1940 | Staples |
| 2,931,249 A | 4/1960 | Walton |
| 3,119,283 A | 1/1964 | Itzhak |
| 3,435,512 A | 4/1969 | Macrobbie |
| 3,519,444 A | 7/1970 | Brown et al. |
| 3,529,457 A | 9/1970 | Bowers |
| 3,682,606 A | 8/1972 | Anderson et al. |
| 3,986,412 A | 10/1976 | Farley et al. |
| 4,123,737 A | 10/1978 | Hoagland, Jr. |
| RE29,989 E | 5/1979 | Polk et al. |
| 4,173,393 A | 11/1979 | Maurer |
| 4,202,404 A | 5/1980 | Carlson |
| 4,584,036 A | 4/1986 | Taub et al. |
| 4,662,259 A | 5/1987 | Dutina |
| 4,670,636 A | 6/1987 | Taub et al. |
| 4,711,795 A | 12/1987 | Takeuchi et al. |
| 4,749,625 A | 6/1988 | Obayashi et al. |

(Continued)

FOREIGN PATENT DOCUMENTS

| | | |
|---|---|---|
| CN | 101709773 A | 5/2010 |
| CN | 102563006 A | 7/2012 |

(Continued)

OTHER PUBLICATIONS

Cheung et al., "Thermal and mechanical properties of Cu—Zr—Al bulk metallic glasses", Journal of Alloys and Compounds, vol. 434-435, 2007, pp. 71-74, doi: 10.1016/j.jallcom.2006.08.109.

(Continued)

*Primary Examiner* — Jenny R Wu

(57) ABSTRACT

Methods and alloy systems for non-Be BMG matrix composite materials that can be used to additively manufacturing parts with superior mechanical properties, especially high toughness and strength, are provided. Alloys are directed to BMGMC materials comprising a high strength BMG matrix reinforced with properly scaled, soft, crystalline metal dendrite inclusions dispersed throughout the matrix in a sufficient concentration to resist fracture.

20 Claims, 21 Drawing Sheets

(56) References Cited

U.S. PATENT DOCUMENTS

| | | |
|---|---|---|
| 4,783,983 A | 11/1988 | Narasimhan |
| 4,810,314 A | 3/1989 | Henderson et al. |
| 4,812,150 A | 3/1989 | Scott |
| 4,823,638 A | 4/1989 | Ishikawa |
| 4,851,296 A | 7/1989 | Tenhover et al. |
| 4,883,632 A | 11/1989 | Goto et al. |
| 4,935,291 A | 6/1990 | Gunnink |
| 5,005,456 A | 4/1991 | Ballard et al. |
| 5,168,918 A | 12/1992 | Okuda et al. |
| 5,185,198 A | 2/1993 | Lefeber et al. |
| 5,288,344 A | 2/1994 | Peker et al. |
| 5,310,432 A | 5/1994 | Yamanaka et al. |
| 5,417,385 A | 5/1995 | Arnold et al. |
| 5,485,761 A | 1/1996 | Rouverol |
| 5,509,978 A | 4/1996 | Masumoto et al. |
| 5,636,550 A | 6/1997 | Deane |
| 5,722,295 A | 3/1998 | Sakai et al. |
| 5,746,844 A | 5/1998 | Sterett et al. |
| 5,772,803 A | 6/1998 | Peker et al. |
| 5,866,272 A | 2/1999 | Westre et al. |
| 5,896,642 A | 4/1999 | Peker et al. |
| 5,985,204 A | 11/1999 | Otsuka et al. |
| 6,162,130 A | 12/2000 | Masumoto et al. |
| 6,273,322 B1 | 8/2001 | Yamamoto et al. |
| 6,321,738 B1 | 11/2001 | Walsh |
| 6,620,264 B2 | 9/2003 | Kundig et al. |
| 6,652,679 B1 | 11/2003 | Inoue et al. |
| 6,732,606 B1 | 5/2004 | Zhu et al. |
| 6,771,490 B2 | 8/2004 | Peker et al. |
| 6,843,496 B2 | 1/2005 | Peker et al. |
| 6,887,586 B2 | 5/2005 | Peker et al. |
| 7,052,561 B2 | 5/2006 | Lu et al. |
| 7,073,560 B2 | 7/2006 | Kang et al. |
| 7,075,209 B2 | 7/2006 | Howell et al. |
| 7,323,071 B1 | 1/2008 | Branagan |
| 7,357,731 B2 | 4/2008 | Johnson et al. |
| 7,360,419 B2 | 4/2008 | French et al. |
| 7,497,981 B2 | 3/2009 | Graham et al. |
| 7,500,987 B2 | 3/2009 | Bassler et al. |
| 7,540,929 B2 | 6/2009 | Demetriou et al. |
| 7,552,664 B2 | 6/2009 | Bulatowicz |
| 7,575,040 B2 | 8/2009 | Johnson |
| 7,862,323 B2 | 1/2011 | Micarelli et al. |
| 7,883,592 B2 | 2/2011 | Hofmann et al. |
| 7,896,982 B2 | 3/2011 | Johnson et al. |
| 7,955,713 B2 | 6/2011 | Roebroeks et al. |
| 8,042,770 B2 | 10/2011 | Martin et al. |
| 8,052,923 B2 | 11/2011 | Langlet |
| 8,333,922 B2 | 12/2012 | Skoglund et al. |
| 8,400,721 B2 | 3/2013 | Bertele et al. |
| 8,418,366 B2 | 4/2013 | Wang et al. |
| 8,485,245 B1 | 7/2013 | Prest et al. |
| 8,496,077 B2 | 7/2013 | Nesnas et al. |
| 8,596,106 B2 | 12/2013 | Tang et al. |
| 8,613,815 B2 | 12/2013 | Johnson et al. |
| 8,639,484 B2 | 1/2014 | Wei et al. |
| 8,789,629 B2 | 7/2014 | Parness et al. |
| 8,986,469 B2 | 3/2015 | Khalifa et al. |
| 9,044,805 B2 | 6/2015 | Prest et al. |
| 9,057,120 B2 | 6/2015 | Pham et al. |
| 9,211,564 B2 | 12/2015 | Hofmann |
| 9,328,813 B2 | 5/2016 | Hofmann et al. |
| 9,579,718 B2 | 2/2017 | Hofmann |
| 9,610,650 B2 | 4/2017 | Hofmann et al. |
| 9,689,231 B2 | 6/2017 | Fripp et al. |
| 9,783,877 B2 | 10/2017 | Hofmann et al. |
| 9,791,032 B2 | 10/2017 | Hofmann et al. |
| 9,868,150 B2 | 1/2018 | Hofmann et al. |
| 9,996,053 B2 | 6/2018 | O'Keeffe et al. |
| 10,081,136 B2 | 9/2018 | Hofmann et al. |
| 10,151,377 B2 | 12/2018 | Hofmann et al. |
| 10,155,412 B2 | 12/2018 | Parness et al. |
| 10,161,025 B2 | 12/2018 | Poole et al. |
| 10,174,780 B2 | 1/2019 | Hofmann et al. |
| 10,471,652 B2 | 11/2019 | Hofmann et al. |
| 10,487,934 B2 | 11/2019 | Kennett et al. |
| 10,690,227 B2 | 6/2020 | Hofmann et al. |
| 10,883,528 B2 | 1/2021 | Hofmann et al. |
| 10,941,847 B2 | 3/2021 | Hofmann et al. |
| 10,953,688 B2 | 3/2021 | Parness et al. |
| 11,014,162 B2 | 5/2021 | Hofmann |
| 11,123,797 B2 | 9/2021 | Hofmann |
| 11,185,921 B2 | 11/2021 | Hofmann et al. |
| 11,400,613 B2 | 8/2022 | Hofmann et al. |
| 2002/0053375 A1 | 5/2002 | Hays et al. |
| 2002/0100573 A1 | 8/2002 | Inoue et al. |
| 2002/0184766 A1 | 12/2002 | Kobayashi et al. |
| 2003/0010409 A1 | 1/2003 | Kunze et al. |
| 2003/0052105 A1 | 3/2003 | Nagano et al. |
| 2003/0062811 A1 | 4/2003 | Peker et al. |
| 2003/0209125 A1 | 11/2003 | Bertolet |
| 2004/0035502 A1 | 2/2004 | Kang et al. |
| 2004/0103536 A1 | 6/2004 | Kobayashi et al. |
| 2004/0103537 A1 | 6/2004 | Kobayashi et al. |
| 2004/0154701 A1 | 8/2004 | Lu et al. |
| 2005/0034792 A1 | 2/2005 | Lu et al. |
| 2005/0084407 A1 | 4/2005 | Myrick |
| 2005/0127139 A1 | 6/2005 | Slattery et al. |
| 2005/0172777 A1 | 8/2005 | Olander et al. |
| 2005/0263932 A1 | 12/2005 | Heugel |
| 2006/0105011 A1 | 5/2006 | Sun et al. |
| 2006/0130944 A1 | 6/2006 | Poon et al. |
| 2006/0156785 A1 | 7/2006 | Mankame et al. |
| 2007/0034304 A1 | 2/2007 | Inoue et al. |
| 2007/0039689 A1 | 2/2007 | Petersson et al. |
| 2007/0144621 A1 | 6/2007 | Farmer et al. |
| 2007/0226979 A1 | 10/2007 | Paton et al. |
| 2007/0228592 A1 | 10/2007 | Dunn et al. |
| 2007/0253856 A1 | 11/2007 | Vecchio et al. |
| 2007/0266841 A1 | 11/2007 | Robinson et al. |
| 2007/0270942 A1 | 11/2007 | Thomas |
| 2008/0085368 A1 | 4/2008 | Gauthier et al. |
| 2008/0099175 A1 | 5/2008 | Chu et al. |
| 2008/0121316 A1 | 5/2008 | Duan et al. |
| 2008/0190521 A1 | 8/2008 | Loffler et al. |
| 2008/0304975 A1 | 12/2008 | Clark et al. |
| 2009/0011846 A1 | 1/2009 | Scott |
| 2009/0078370 A1 | 3/2009 | Sklyarevich et al. |
| 2009/0114317 A1 | 5/2009 | Collier et al. |
| 2009/0194205 A1 | 8/2009 | Loffler et al. |
| 2009/0246398 A1 | 10/2009 | Kurahashi et al. |
| 2009/0263582 A1 | 10/2009 | Batchelder |
| 2009/0277540 A1 | 11/2009 | Langlet |
| 2009/0288741 A1 | 11/2009 | Zhang et al. |
| 2010/0313704 A1 | 12/2010 | Wang et al. |
| 2011/0048587 A1 | 3/2011 | Vecchio et al. |
| 2011/0154928 A1 | 6/2011 | Ishikawa |
| 2011/0165339 A1 | 7/2011 | Skoglund et al. |
| 2011/0302783 A1 | 12/2011 | Nagata et al. |
| 2012/0006085 A1 | 1/2012 | Johnson et al. |
| 2012/0067100 A1 | 3/2012 | Stefansson et al. |
| 2012/0073710 A1 | 3/2012 | Kim et al. |
| 2012/0077052 A1 | 3/2012 | Demetriou et al. |
| 2012/0132631 A1 | 5/2012 | Wescott et al. |
| 2012/0133080 A1 | 5/2012 | Moussa et al. |
| 2012/0289946 A1 | 11/2012 | Steger |
| 2013/0009338 A1 | 1/2013 | Mayer |
| 2013/0039708 A1 | 2/2013 | Stenman |
| 2013/0048152 A1 | 2/2013 | Na et al. |
| 2013/0062134 A1 | 3/2013 | Parness et al. |
| 2013/0068527 A1 | 3/2013 | Parness et al. |
| 2013/0112321 A1 | 5/2013 | Poole et al. |
| 2013/0133787 A1 | 5/2013 | Kim |
| 2013/0139964 A1 | 6/2013 | Hofmann et al. |
| 2013/0143060 A1 | 6/2013 | Jacobsen et al. |
| 2013/0255837 A1 | 10/2013 | Peker et al. |
| 2013/0277891 A1 | 10/2013 | Teulet |
| 2013/0280547 A1 | 10/2013 | Brandl et al. |
| 2013/0309121 A1 | 11/2013 | Prest et al. |
| 2013/0316867 A1 | 11/2013 | Kobayashi |
| 2013/0316868 A1 | 11/2013 | Kobayashi |
| 2013/0333814 A1 | 12/2013 | Fleury et al. |
| 2014/0004352 A1 | 1/2014 | McCrea et al. |
| 2014/0010968 A1 | 1/2014 | Prest et al. |

(56) References Cited

U.S. PATENT DOCUMENTS

| | | |
|---|---|---|
| 2014/0020794 A1 | 1/2014 | Hofmann et al. |
| 2014/0030948 A1 | 1/2014 | Kim et al. |
| 2014/0045680 A1 | 2/2014 | Nakayama et al. |
| 2014/0048969 A1 | 2/2014 | Swanson et al. |
| 2014/0070445 A1 | 3/2014 | Mayer |
| 2014/0083640 A1 | 3/2014 | Waniuk et al. |
| 2014/0090752 A1 | 4/2014 | Waniuk et al. |
| 2014/0093674 A1 | 4/2014 | Hofmann et al. |
| 2014/0141164 A1 | 5/2014 | Hofmann |
| 2014/0163717 A1 | 6/2014 | Das et al. |
| 2014/0202595 A1 | 7/2014 | Hofmann |
| 2014/0203622 A1 | 7/2014 | Yamamoto et al. |
| 2014/0213384 A1 | 7/2014 | Johnson et al. |
| 2014/0224050 A1 | 8/2014 | Hofmann et al. |
| 2014/0227125 A1 | 8/2014 | Hofmann |
| 2014/0246809 A1 | 9/2014 | Hofmann et al. |
| 2014/0293384 A1 | 10/2014 | O'keeffe et al. |
| 2014/0312098 A1 | 10/2014 | Hofmann et al. |
| 2014/0332120 A1 | 11/2014 | Liu et al. |
| 2014/0334106 A1 | 11/2014 | Prest et al. |
| 2014/0342179 A1 | 11/2014 | Hofmann et al. |
| 2014/0348571 A1 | 11/2014 | Prest et al. |
| 2015/0014885 A1 | 1/2015 | Hofmann et al. |
| 2015/0044084 A1 | 2/2015 | Hofmann et al. |
| 2015/0047463 A1 | 2/2015 | Hofmann et al. |
| 2015/0068648 A1 | 3/2015 | Schroers et al. |
| 2015/0075744 A1 | 3/2015 | Hofmann et al. |
| 2015/0158067 A1 | 6/2015 | Kumar et al. |
| 2015/0165693 A1 | 6/2015 | Sagoo et al. |
| 2015/0183169 A1 | 7/2015 | Ehsani |
| 2015/0209094 A1 | 7/2015 | Anderson |
| 2015/0209889 A1 | 7/2015 | Peters et al. |
| 2015/0219572 A1 | 8/2015 | Beuth, Jr. et al. |
| 2015/0284035 A1 | 10/2015 | Reese |
| 2015/0289605 A1 | 10/2015 | Prest et al. |
| 2015/0298443 A1 | 10/2015 | Hundley et al. |
| 2015/0299825 A1 | 10/2015 | Poole et al. |
| 2015/0314566 A1 | 11/2015 | Mattlin et al. |
| 2015/0315678 A1 | 11/2015 | Poole et al. |
| 2015/0323053 A1 | 11/2015 | El-Wardany et al. |
| 2015/0352794 A1 | 12/2015 | Nguyen et al. |
| 2016/0023438 A1 | 1/2016 | Johnson et al. |
| 2016/0175929 A1 | 6/2016 | Colin et al. |
| 2016/0178047 A1 | 6/2016 | Kennett et al. |
| 2016/0186850 A1 | 6/2016 | Hofmann et al. |
| 2016/0233089 A1 | 8/2016 | Zenou et al. |
| 2016/0242877 A1 | 8/2016 | Bernhard |
| 2016/0258522 A1 | 9/2016 | Hofmann et al. |
| 2016/0263937 A1 | 9/2016 | Parness et al. |
| 2016/0265576 A1 | 9/2016 | Hofmann et al. |
| 2016/0299183 A1 | 11/2016 | Lee |
| 2016/0361765 A1 | 12/2016 | Danger et al. |
| 2016/0361897 A1 | 12/2016 | Hofmann et al. |
| 2017/0021417 A1 | 1/2017 | Martin et al. |
| 2017/0050241 A1 | 2/2017 | Thomas et al. |
| 2017/0121799 A1 | 5/2017 | Hofmann et al. |
| 2017/0137955 A1 | 5/2017 | Hofmann et al. |
| 2017/0144225 A1 | 5/2017 | Hofmann |
| 2017/0211168 A1 | 7/2017 | Liu et al. |
| 2017/0226619 A1 | 8/2017 | Hofmann et al. |
| 2017/0276225 A1 | 9/2017 | Takehana et al. |
| 2017/0305003 A1 | 10/2017 | Tannhaeuser |
| 2017/0321790 A1 | 11/2017 | Klassen et al. |
| 2018/0119259 A1 | 5/2018 | Hofmann et al. |
| 2018/0257141 A1 | 9/2018 | Hofmann et al. |
| 2018/0272432 A1 | 9/2018 | Jonsson et al. |
| 2018/0339338 A1 | 11/2018 | Hofmann et al. |
| 2018/0339342 A1 | 11/2018 | Hofmann |
| 2018/0345366 A1 | 12/2018 | Hofmann |
| 2019/0009464 A1 | 1/2019 | Steege |
| 2019/0022923 A1 | 1/2019 | Hofmann et al. |
| 2019/0037721 A1 | 1/2019 | Curran et al. |
| 2019/0126674 A1 | 5/2019 | Parness et al. |
| 2019/0154130 A1 | 5/2019 | Hofmann et al. |
| 2019/0170235 A1 | 6/2019 | Hofmann et al. |
| 2019/0177826 A1 | 6/2019 | Hofmann et al. |
| 2019/0195269 A1 | 6/2019 | Hofmann et al. |
| 2019/0255635 A1 | 8/2019 | Hänni et al. |
| 2019/0314903 A1 | 10/2019 | Haenle et al. |
| 2020/0000595 A1 | 1/2020 | Jones et al. |
| 2020/0278016 A1 | 9/2020 | Hofmann et al. |
| 2020/0278017 A1 | 9/2020 | Hofmann et al. |
| 2020/0282582 A1 | 9/2020 | Hofmann et al. |
| 2020/0284146 A1 | 9/2020 | Yahnker et al. |
| 2020/0318721 A1 | 10/2020 | Hofmann et al. |
| 2020/0406579 A1 | 12/2020 | Hahnlen |
| 2021/0268585 A1 | 9/2021 | Hofmann |
| 2022/0212254 A1 | 7/2022 | Hofmann et al. |

FOREIGN PATENT DOCUMENTS

| | | |
|---|---|---|
| CN | 103153502 A | 6/2013 |
| CN | 203227820 U | 10/2013 |
| CN | 104117672 A | 10/2014 |
| CN | 104117672 B | 1/2017 |
| DE | 102005014972 A1 | 10/2006 |
| DE | 102009034566 A1 | 2/2011 |
| DE | 102010062089 A1 | 5/2012 |
| DE | 112018001284 T5 | 11/2019 |
| EP | 0127366 A1 | 5/1984 |
| EP | 1063312 A1 | 12/2000 |
| EP | 1138798 A1 | 10/2001 |
| EP | 1696153 A1 | 8/2006 |
| EP | 1404884 B1 | 7/2007 |
| EP | 1944138 A2 | 7/2008 |
| EP | 2933044 A1 | 10/2015 |
| EP | 3630392 A1 | 4/2020 |
| EP | 3630395 A1 | 4/2020 |
| EP | 3630397 A2 | 4/2020 |
| JP | 60116775 A | 6/1985 |
| JP | 61276762 A | 12/1986 |
| JP | 62227070 A | 10/1987 |
| JP | 09121094 A | 5/1997 |
| JP | 2002045960 A | 2/2002 |
| JP | 2004315340 A | 11/2004 |
| JP | 2004353053 A | 12/2004 |
| JP | 2007040517 A | 2/2007 |
| JP | 2007040518 A | 2/2007 |
| JP | 2007247037 A | 9/2007 |
| JP | 2008115932 A | 5/2008 |
| JP | 2008264865 A | 11/2008 |
| JP | 2010523822 A | 7/2010 |
| JP | 2011045931 A | 3/2011 |
| JP | 2012502178 A | 1/2012 |
| JP | 2012046826 A | 3/2012 |
| JP | 2012162805 A | 8/2012 |
| JP | 2012214826 A | 11/2012 |
| JP | 2013057397 A | 3/2013 |
| JP | 5249932 B2 | 7/2013 |
| JP | 2013238278 A | 11/2013 |
| JP | 2013544648 A | 12/2013 |
| JP | 5611593 B2 | 9/2014 |
| JP | 5723277 B2 | 4/2015 |
| JP | 2018149655 A | 9/2018 |
| KR | 101420176 B1 | 7/2014 |
| KR | 1020190119154 A | 10/2019 |
| KR | 1020200004435 A | 1/2020 |
| KR | 1020200011470 A | 2/2020 |
| WO | 2005077560 A1 | 8/2005 |
| WO | 2006073428 A2 | 7/2006 |
| WO | 2007038882 A1 | 4/2007 |
| WO | 2008058896 A1 | 5/2008 |
| WO | 2008156889 A2 | 12/2008 |
| WO | 2009069716 A1 | 6/2009 |
| WO | 2010027317 A1 | 3/2010 |
| WO | 2011159596 A1 | 12/2011 |
| WO | 2012031022 A2 | 3/2012 |
| WO | 2012083922 A1 | 6/2012 |
| WO | 2012147559 A1 | 11/2012 |
| WO | 2013138710 A1 | 9/2013 |
| WO | 2013141878 A1 | 9/2013 |
| WO | 2013141882 A1 | 9/2013 |
| WO | 2014004704 A1 | 1/2014 |
| WO | 2014012113 A2 | 1/2014 |

(56) References Cited

FOREIGN PATENT DOCUMENTS

| WO | 2014058498 A3 | 4/2014 |
|---|---|---|
| WO | 2015042437 A1 | 3/2015 |
| WO | 2015156797 A1 | 10/2015 |
| WO | 2016116562 A1 | 7/2016 |
| WO | 2018165662 A1 | 9/2018 |
| WO | 2018218077 A1 | 11/2018 |
| WO | 2018218247 A1 | 11/2018 |
| WO | 2018223117 A2 | 12/2018 |
| WO | 2018223117 A3 | 1/2019 |

OTHER PUBLICATIONS

Davis, "Gear Materials, Properties, and Manufacture", ASM International, Sep. 2005, Chapters 1-3, pp. 1-76.
Jiang et al., "Microstructure evolution and mechanical properties of $Cu_{46}Zr_{47}Al_7$ bulk metallic glass composite containing CuZr crystallizing phases", Materials Science and Engineering A, vol. 467, 2007, pp. 139-145, doi: 10.1016/j.mesa.2007.02.093.
Kuhn et al., "Microstructure and mechanical properties of slowly cooled Zr—Nb—Cu—Ni—Al composites with ductile bcc phase", Materials Science and Engineering A, Jul. 2004, vol. 375-377, pp. 322-326, doi:10.1016/j.msen.2003.10.086.
Yokoyama et al., "Tough Hypoeutectic Zr-Based Bulk Metallic Glasses", Metallurgical and Materials Transactions, Year 2011, vol. 42A, pp. 1468-1475, DOI: 10.1007/s11661-011-0631-1.
Extended European Search Report for European Application No. 14889035.3, Search completed Dec. 4, 2017, dated Dec. 13, 2017, 10 Pgs.
Extended European Search Report for European Application No. 18806700.3, Search completed Oct. 20, 2020, dated Oct. 28, 2020, 7 Pgs.
Extended European Search Report for European Application No. 18809486.6, Search completed Sep. 30, 2030, dated Oct. 12, 2020, 7 Pgs.
Extended Search Report for European Application No. 18805898.6, Search completed Jan. 20, 2021, dated Jan. 28, 2021, 13 Pgs.
International Preliminary Report on Patentability for International Application PCT/US2018/035813, Report dated Dec. 3, 2019, dated Dec. 12, 2019, 9 Pgs.
International Preliminary Report on Patentability for International Application PCT/US2013/047950, dated Dec. 31, 2014, dated Jan. 8, 2015, 7 Pgs.
International Preliminary Report on Patentability for International Application PCT/US2013/050614, dated Jan. 20, 2015, dated Jan. 29, 2015, 9 Pgs.
International Preliminary Report on Patentability for International Application PCT/US2014/033510, dated Oct. 12, 2016, dated Oct. 20, 2016, 9 Pgs.
International Preliminary Report on Patentability for International Application PCT/US2014/056615, dated Mar. 22, 2016, dated Mar. 31, 2016, 11 Pgs.
International Preliminary Report on Patentability for International Application PCT/US2018/022020, Report dated Sep. 10, 2019, dated Sep. 19, 2019, 10 Pgs.
International Preliminary Report on Patentability for International Application PCT/US2018/034481, Report dated Nov. 26, 2019, dated Dec. 5, 2019, 17 Pgs.
International Preliminary Report on Patentability for International Application PCT/US2018/034924, Report dated Nov. 26, 2019, dated Dec. 5, 2019, 13 Pgs.
International Search Report and Written Opinion for International Application No. PCT/US2013/050614, Completed May 7, 2014, dated May 7, 2014, 12 pgs.
International Search Report and Written Opinion for International Application No. PCT/US2018/022020, Search completed Jul. 2, 2018, dated Jul. 3, 2018, 12 Pgs.
International Search Report and Written Opinion for International Application No. PCT/US2018/034481, Search completed Sep. 10, 2018, dated Sep. 10, 2018, 19 Pgs.
International Search Report and Written Opinion for International Application No. PCT/US2018/034924, Search completed Sep. 18, 2018, dated Sep. 19, 2018, 15 Pgs.
International Search Report and Written Opinion for International Application No. PCT/US2018/035813, Search completed Dec. 12, 2018, dated Dec. 12, 2018, 11 Pgs.
International Search Report and Written Opinion for International Application PCT/US2013/047950, completed Oct. 8, 2013, dated Oct. 10, 2013, 9 pgs.
International Search Report and Written Opinion for International Application PCT/US2014/033510, completed Jan. 8, 2015, dated Jan. 8, 2015, 11 Pgs.
International Search Report and Written Opinion for International Application PCT/US2014/056615, completed Dec. 29, 2014, dated Dec. 30, 2014, 13 Pgs.
"Corrosion of Titanium and Titanium Alloys", Total Materia., printed Feb. 16, 2016 from http://www.totalmateria.com/Article24.htm, published Sep. 2001, 4 pgs.
"Gear", Dictionary.com. Accessed Aug. 30, 2016.
"Group 4 element", Wikipedia. https://en.wikipedia.org/wiki/Group_4_element. Published Jun. 11, 2010. Accessed Aug. 24, 2016.
"Harmonic Drive", Wikipedia, printed Feb. 20. 2014, 4 pgs.
"Harmonic Drive AG", website, printed from http://harmoncdrive.aero/?idcat=471, Feb. 20, 2014, 2 pgs.
"Harmonic Drive Polymer GmbH", printed Feb. 20, 2014 from http://www.harmonicdrive.de/English/the-company/subsidiaries/harmonic-drive-polymer-gmbh.html, 1 pg.
"Introduction to Thermal Spray Processing", ASM International, Handbook of Thermal Spray Technology (#06994G), 2004, 12 pgs.
Abdeljawad et al., "Continuum Modeling of Bulk Metallic Glasses and Composites", Physical Review Letters, vol. 105, 205503, Sep. 17, 2010, pp. 125503-1-125503-4, DOI: 10.1103/PhysRevLett.15.125503.
Abrosimova et al., "Crystalline layer on the surface of Zr-based bulk metallic glasses", Journal of Non-Crystalline solids, Mar. 6, 2001, vol. 288, pp. 121-126.
Adharapurapu et al., "Fracture of Ti-Al3Ti metal-intermetallic laminate composites: Effects of lamination on resistance-curve behavior", Metallurgical and Materials Transactions A, Nov. 2005, vol. 36A, 3217-3236.
An et al., "Synthesis of Single-Component Metallic Glasses by Thermal Spray of Nanodroplets on Amorphous Substrates", Applied Physics Letters, Jan. 26, 2012, vol. 100, pp. 041909-1-041909-4, doi: 10.1063/1.3675909.
Anstis et al., "A Critical Evaluation of Indentation Techniques for Measuring Fracture Toughness: I, Direct Crack Measurements", Journal of American Ceramic Society, Sep. 1, 1981, vol. 64, No. 8, pp. 533-538.
Ashby et al., "Metallic glasses of structural materials", Scripta Materialia, Feb. 2006, vol. 54, pp. 321-326, doi:10.1016/j.scriptamat.2005.09.051.
Bakkal, "Sliding tribological characteristics of Zr-based bulk metallic glass under Tubricated conditions", Intermetallics, Mar. 19, 2010, vol. 18, pp. 1251-1253, doi:10.1016/j.intermet.2010.02.003.
Bardt et al., "Micromolding three-dimensional amorphous metal structures", J. Mater. Res, Feb. 2007, vol. 22, No. 2, pp. 339-343, DOI: 10.1557/JMR.2007.0035.
Basu et al., "Laser surface coating of Fe—Cr—Mo—Y—B—C bulk metallic glass composition on AISI 4140 steel", Surface & Coatings Technology, Mar. 15, 2008, vol. 202, pp. 2623-2631, doi:10.1016/j.surfcoat.2007.09.028.
Berger, "A Survey of Additive Manufacturing Processes Applied on the Fabrication of Gears", 1st International Conference on Progress in Additive Manufacturing (Pro-AM 2014), May 26-28, 2014, pp. 315-320, doi: 10.3850/978-981-09-0446-3_010.
Boopathy et al., "Near-threshold fatigue crack growth in bulk metallic glass composites", J. Mater. Res., vol. 24, No. 12, pp. 3611-3619, Dec. 2009, DOI: 10.1557/fmr.2009.0439., Dec. 2009.
Bordeenithikasem et al., "Glass forming ability, flexural strength, and wear properties of additively manufactured Zr-based bulk metallic glasses produced through laser powder bed fusion", Addi-

(56) References Cited

OTHER PUBLICATIONS tive Manufacturing, Mar. 21, 2018, vol. 21, pp. 312-317, https://doi.org/10.1016/j.addma.2018.03.023.
Branagan et al., "Wear Resistant Amorphous and Nanocomposite Steel Coatings", Met. Mater. Trans. A, Apr. 26, 2001, 32A; Idaho National Engineering and Environmental Laboratory, DOI 10.1007/s11661-001-0051-8, 15 pgs.
Byrne et al., "Bulk Metallic Glasses", Science, Jul. 25, 2008, vol. 321, pp. 502-503, doi:10.1126/science.1158864.
Cadney et al., "Cold Gas Dynamic Spraying as A Method for Freeforming and Joining Materials", Science Direct, Surface & Coatings Technology, Mar. 15, 2008, vol. 202, pp. 2801-2806, available online Oct. 17, 2007, doiL 10.1016/j.surfcoat.2007.10.010.
Calin et al., "Improved mechanical behavior of Cu—Ti-based bulk metallic glass by in situ formation of nanoscale precipitates", Scripta Materialia, Mar. 17, 2003, vol. 48, pp. 653-658.
Chen et al., "Elastic Constants, Hardness and Their Implications to Flow Properties of Metallic Glasses", Journal of Non-crystalline Solids, Sep. 1, 1975, vol. 18, pp. 157-171.
Chen et al., "Formation of Micro-Scale Precision Flexures Via Molding of Metallic Glass", Proceeding of the Annual Meeting of the ASPE, Monterey, CA, 2006, pp. 283-286.
Chen et al., "Influence of laser surface melting on glass formation and tribological behaviors of $Zr_{55}Al_{10}Ni_5Cu_{30}$ alloy", J. Mater Res. Oct. 28, 2011, vol. 26, No. 20, pp. 2642-2652, DOI: 10.1157/jmr.2011.278.
Cheng et al., "Characterization of Mechanical Properties of Fecrbsimnnby Metallic Glass Coatings", J Mater Sci., Apr. 16, 2009, vol. 44, pp. 3356-3363, DOI: 10.1007/s10853-009-3436-5.
Cheng et al., "Correlation of the microstructure and mechanical properties of Zr-based in-situ bulk metallic glass matrix composites", Intermetallics, Sep. 24, 2010, vol. 18, Issue 12, pp. 2425-2430, doi:10.1016/j.intermet.2010.08.040.
Choi et al., "Tribological behavior of the kinetic sprayed Ni59Ti16Zr20Si2Sn3 bulk metallic glass", Journal of Alloys and Compounds, May 31, 2007, vol. 434-435, pp. 64-67, doi:10.1016/j.jallcom.2006.08.283.
Conner et al., "Shear band spacing under bending of Zr-based metallic glass plates", Acta Materialia, Jan. 27, 2004, vol. 52, pp. 2429-2434, doi:10.1016/j.actamat.2004.01.034.
Conner et al., "Shear bands and cracking of metallic glass plates in bending", Journal of Applied Physics, Jul. 15, 2003, vol. 94, No. 2, pp. 904-911, DOI: 10.1063/1.1582555.
Dai et al., "A new centimeter-diameter Cu-based bulk metallic glass", Scripta Materialia, Jan. 20, 2006, vol. 54, pp. 1403-1408, doi:10.1016/j.scriptamat.2005.11.077.
Dai et al., "High-performance bulk Ti—Cu—Ni—Sn—Ta nanocomposites based on a dendrite-eutectic microstructure", Journal of Materials Research, Sep. 2004, vol. 19, No. 9, pp. 2557-2566, DOI: 10.1557/JMR.2004.0332.
Davis, "Hardness/Strength Ratio of Metallic Glasses", Scripta Metallurgica, Feb. 18, 1975, vol. 9, pp. 431-436.
De Beer et al., "Surface Folds Make Tears and Chips", Physics, Sep. 4, 2012, vol. 100, 3 pgs., DOI: 10.1103/Physics.5.100.
Demetriou et al., "Glassy steel optimized for glass-forming ability and toughness", Applied Physics Letters, Jul. 31, 2009, vol. 95; pp. 041907-1-041907-3; http:/idx.doi.org/10.1063/1.3184792.
Dislich et al., "Amorphous and Crystalline Dip Coatings Obtained from Organometallic Solutions: Procedures, Chemical Processes and Products", Metallurgical and Protective Coatings, Mar. 6, 1981, vol. 77, pp. 129-139.
Duan et al., "Lightweight Ti-based bulk metallic glasses excluding late transition metals", Scripta Materialia, Mar. 2008, vol. 58, pp. 465-468, doi:10.1016/h,scriptamat.2007.10.040.
Duan et al., "Tribological properties of $Zr_{41.25}Ti_{13.75}Cu_{12.5}Be_{22.5}$ bulk metallic glasses under different conditions", Journal of Alloys and Compounds, Mar. 2, 2012, vol. 528, pp. 74-78, doi:10.1016/j.jallcom.2012.02.104.
Fan et al., "Metallic glass matrix composite with precipitated ductile reinforcement", Applied Physics Letters, Aug. 5, 2002, vol. 81, Issue 6, pp. 1020-1022, DOI: 10.1063/1.1498864.
Fleury et al., "Tribological properties of bulk metallic glasses", Materials Science and Engineering, Jul. 2004, vol. A375-377, pp. 276-279, doi:10.1016/j.msea.2003.10.065.
Fornell et al., "Enhanced mechanical properties and in vitro corrosion behavior of amorphous and devitrified $Ti_{40}Zr_{10}Cu_{38}Pd_{12}$ metallic glass", Journal of the Mechanical Behavior of Biomedical Materials, May 27, 2011, vol. 4, pp. 1709-1717, doi:10.1016/j.jmbbm.2011.05.028.
Fu et al., "Sliding behavior of metallic glass Part I. Experimental investigations", Wear, Oct. 2001, vol. 250, pp. 409-419.
Ganesan et al., "Bonding Behavior Studies of Cold Sprayed Copper Coating on The PVC Polymer Substrate", Surface & Coatings Technology, Jul. 10, 2012, vol. 207, pp. 262-269.
Garrett et al., "Effect of microalloying on the toughness of metallic glasses", Applied Physics Letter, Dec. 12, 2012, vol. 101, 241913-1-241913-3, http://dx.doi.org/10.1063/1.47699997.
Gleason Corporation, "Gear Product News", Introducing genesis, The Next Generation in Gear Technology, Apr. 2006, 52 pgs.
Gloriant, "Microhardness and abrasive wear resistance of metallic glasses and nanostructured composite materials", Journal of Non-Crystalline Solids, Feb. 2003, vol. 316, pp. 96-103.
Greer, "Partially or fully devitrified alloys for mechanical properties", Materials and Science and Engineering, May 31, 2001, vol. A304, pp. 68-72.
Greer et al., "Wear resistance of amorphous alloys and related materials", International Materials Reviews, Apr. 1, 2002, vol. 47, No. 2, pp. 87-112, DOI: 10.1179/095066001225001067.
Gu et al., "Selective Laser Melting Additive Manufacturing of Ti-Based Nanocomposites: The Role of Nanopowder", Metallurgical and Materials Transactions A, Jan. 2014, vol. 45, pp. 464-476, DOI: 10.1007/s11661-013-1968-4.
Guo et al., "Tensile ductility and necking of metallic glass", Nature Materials, Oct. 2007, vol. 6, pp. 735-739, published online Aug. 19, 2007, doi:10.1038/nmat1984.
Ha et al., "Tensile deformation behavior of two Ti-based amorphous matrix composites containing ductile β dendrites", Materials Science and Engineering: A, May 28, 2012, vol. 552, pp. 404-409, http://dx.doi.org/10.1016/j.msea.2012.05.061.
Hale, "Principles and Techniques for Designing Precision Machines", Ph.D. Thesis, Feb. 1999, 493 pgs.
Harmon et al., "Anelastic to Plastic Transition in Metallic Glass-Forming Liquids", Physical Review Letters, Sep. 28, 2007, vol. 99, 135502-1-135502-4, DOI: 10.1103/PhysRevLett.99.135502.
Haruyama et al., "Volume and enthalpy relaxation in Zr55Cu30Ni5Al10 bulk metallic glass", Acta Materialia, Mar. 2010, vol. 59, pp. 1829-1836, doi:10.1016/jactamat.2009.11.025.
Hays et al., "Microstructure Controlled Shear Band Pattern Formation and Enhanced Plasticity of Bulk Metallic Glasses Containing in situ Formed Ductile Phase Dendrite Dispersions", Physical Review Letters, Mar. 27, 2000, vol. 84, pp. 2901-2904.
He et al., "Novel Ti-base nanostructure-dendrite composite with enhanced plasticity", Nature Materials, Jan. 2003, Published Dec. 8, 2002, vol. 2, pp. 33-37, doi: 10.1038/nmat792.
Hejwowski et al., "A Comparative Study of Electrochemical Properties of Metallic Glasses and Weld Overlay Coatings", Vacuum, Feb. 2013, vol. 88, pp. 118-123, doi:10.1016/j.vacuum.2012.02.031.
Hofmann, "Bulk Metallic Glasses and Their Composites: A Brief History of Diverging Fields", Journal of Materials, Jan. 2013, vol. 2013, 7 pgs., http://dx.doi.org/10.1155/2013/517904.
Hofmann, "Shape Memory Bulk Metallic Glass Composites", Science, Sep. 10, 2010, vol. 329, pp. 1294-1295, doi:10.1126/science.1193522.
Hofmann et al., "Designing metallic glass matrix composites with high toughness and tensile ductility", Nature Letters, Feb. 28, 2008, vol. 451, pp. 1085-1090, doi: 10.1038/nature06598.
Hofmann et al., "Development of tough, low-density titanium-based bulk metallic glass matrix composites with tensile ductility", PNAS, Dec. 23, 2008, vol. 105, pp. 20136-20140, www.pnas.org/cgi/doi/10.1073/pnas.0809000106.

(56) References Cited

OTHER PUBLICATIONS

Hofmann et al., Improving Ductility in Nanostructured Materials and Metallic Glasses: "Three Laws", Material Science Forum, 2010, vols. 633-634, pp. 657-663, published online Nov. 19, 2009, doi:10.4028/www.scientific.net/MSF.633-634.657.
Hofmann et al., "Semi-solid Induction Forging of Metallic Glass Matrix Composites", JOM, Dec. 2009, vol. 61, No. 12, pp. 11-17, plus cover.
Hong et al., "Microstructural Characteristics of High-Velocity Oxygen-Fuel (HVOF) Sprayed Nickel-Based Alloy Coating", Journal of Alloys and Compounds, Jul. 26, 2013, vol. 581, pp. 398-403, http://dx.doi.org/10.1016/j.jallcom.2013.07.109.
Hu et al., "Crystallization Kinetics of the $Cu_{47.5}Zr_{74.5}Al_5$ Bulk Metallic Glass under Continuous and Iso-thermal heating", Applied Mechanics and Materials, Sep. 8, 2011, vols. 99-100, pp. 1052-1058, doi:10.4028/www.scientific.net/AMM.99-100.1052.
Huang et al., "Dendritic microstructure in the metallic glass matrix composite $Zr_{56}Ti_{14}Nb_5Cu_7Ni_6Be_{12}$", Scripta Materialia, Mar. 29, 2005, vol. 53, pp. 93-97, doi:10.1016/j.scriptamat.2005.03.005.
Huang et al., "Fretting wear behavior of bulk amorphous steel", Intermetallics, Jun. 12, 2011, vol. 19, pp. 1385-1389, doi:10.1016/j.intermet.2011.04.014.
Inoue et al., "Cobalt-based bulk glassy alloy with ultrahigh strength and soft magnetic properties", Nature Materials, Oct. 21, 2003, vol. 2, pp. 661-663, doi:10.1038/nmat982.
Inoue et al., "Development and applications of late transition metal bulk metallic glasses", Bulk Metallic Glasses, pp. 1-25, 2008.
Inoue et al., "Developments and applications of bulk metallic glasses", Reviews on Advanced Materials Science, Feb. 28, 2008, vol. 18, pp. 1-9.
Inoue et al., "Preparation of 16 mm Diameter Rod of Amorphous $Zr_{65}Al_{7.5}Ni_{10}Cu_{17.5}$ Alloy", Material Transactions, JIM, 1993, vol. 34, No. 12, pp. 1234-1237.
Inoue et al., "Recent development and application products of bulk glassy alloys", Acta Materialia, Jan. 20, 2011, vol. 59, Issue 6, pp. 2243-2267, doi.10.1016/j.actamat.2010.11.027.
Ishida et al., "Wear Resistivity of Super-Precision Microgear Made of Ni-Based Metallic Glass", Materials Science and Engineering, Mar. 25, 2007, vol. A449-451, pp. 149-154, doi:10.1016/j.msea.2006.02.300.
Jiang et al., "Low-Density High-Strength Bulk Metallic Glasses and Their Composites: A Review", Advanced Engineering Materials, Nov. 19, 2014, pp. 1-20, DOI: 10.1002/adem.201400252.
Jiang et al., "Tribological Studies of a Zr-Based Glass-Forming Alloy with Different States", Advanced Engineering Materials, Sep. 14, 2009, vol. 1, No. 11, pp. 925-931, DOI: 10.1002/adem.200900184.
Johnson et al., "Quantifying the Origin of Metallic Glass Formation", Nature Communications, Jan. 20, 2016, vol. 7, 10313, 7 pgs. doi: 10.1038/ncomms10313.
Jung et al., "Fabrication of Fe-based bulk metallic glass by selective laser melting: A parameter study", Materials and Design, Jul. 30, 2015, vol. 86, pp. 703-708, http://dx.doi.org/10.1016/j.matdes.2015.07.145.
Kahraman et al., "A Feasibility Study on Development of Dust Abrasion Resistant Gear Concepts for Lunar Vehicle Gearboxes", NASA Grant NNX07AN42G Final Report, Mar. 11, 2009, 77 pgs.
Kim et al., "Amorphous Phase Formation of Zr-Based Alloy Coating by HVOF Spraying Process", Journal of Materials Science, Jan. 1, 2001, vol. 36, pp. 49-54.
Kim et al., "Design and synthesis of Cu-based metallic glass alloys with high glass forming ability", Journal of Metastable and Nanocrystalline Materials, Sep. 1, 2005, vols. 24-25, pp. 93-96, doi:10.4028/www.scientific.net/JMNM.24-25.93.
Kim et al., "Enhancement of Metallic Glass Properties of Cu-Based BMG Coating by Shroud Plasma Spraying", Science Direct, Surface & Coatings Technology, Jan. 25, 2011, vol. 205, pp. 3020-3026, doi:10.1016/j.surfcoat.2010.11.012.
Kim et al., "Oxidation and Crystallization Mechanisms in Plasma-Sprayed Cu-Based Bulk Metallic Glass Coatings", Acta Materialia., Feb. 1, 2010, vol. 58, pp. 952-962, doi:10.1016/j.actamat.2009.10.011.
Kim et al., "Production of $Ni_{65}Cr_{15}P_{16}B_4$ Metallic Glass-Coated Bipolar Plate for Fuel Cell by High Velocity Oxy-Fuel (HVOF) Spray Coating Method", The Japan Institute of Metals, Materials Transactions, Aug. 25, 2010, vol. 51, No. 9. pp. 1609-1613.
Kim et al., "Realization of high tensile ductility in a bulk metallic glass composite by the utilization of deformation-induced martensitic transformation", Scripta Materialia, May 3, 2011, vol. 65, pp. 304-307, doi:10.1016/j.scriptamat.2011.04.037.
Kim et al., "Weldability of $Cu_{54}Zr_{22}Ti_{18}Ni_6$ bulk metallic glass by ultrasonic welding processing", Materials Letters, May 17, 2014, vol. 130, pp. 160-163, http://dx.doi.org/10.1016/j.matlet.2014.05.056.
Kobayashi et al., "Fe-Based Metallic Glass Coatings Produced by Smart Plasma Spraying Process", Materials Science and Engineering, 2007, vol. B148, pp. 110-113, doi:10.1016/j.mseb.2007.09.035.
Kobayashi et al., "Mechanical Property of Fe-Base Metallic Glass Coating Formed by Gas Tunnel Type Plasma Spraying", ScienceDirect, Surface & Coatings Technology, (2007), 6 pgs., doi:10.1016/j.surfcoat.2007.09.011.
Kobayashi et al., "Property of Ni-Based Metallic Glass Coating Produced by Gas Tunnel Type Plasma Spraying", International Plasma Chemistry Society, ISPC 20, 234, Philadelphia, USA, Jul. 24, 2011, Retrieved from: http://www.ispc-conference.org/ispcproc/ispc20/234.pdf.
Kong et al., "Effect of Flash Temperature on Tribological Properties of Bulk Metallic Glasses", Tribol. Lett., Apr. 25, 2009, vol. 35, pp. 151-158, DOI 10.1007/s11249-009-9444-4.
Kozachkov et al., "Effect of cooling rate on the volume fraction of B2 phases in a CuZrAlCo metallic glass matrix composite", Intermetallics, Apr. 19, 2013, vol. 39, pp. 89-93, http://dx.org/10.1016/j.intermet.2013.03.017.
Kuhn et al., "ZrNbCuNiAl bulk metallic glass matrix composites containing dendritic bcc phase precipitates", Applied Physics Letters, Apr. 8, 2002, vol. 80, No. 14, pp. 2478-2480.
Kumar et al., "Bulk Metallic Glass: The Smaller the Better", Advanced Materials, Jan. 25, 2011, vol. 23, pp. 461-476, doi: 10.1002/adma.201002148.
Kumar et al., "Embrittlement of Zr-based Bulk Metallic Glasses", Science Direct, Acta Materialia, 2009, vol. 57, pp. 3572-3583, available online May 11, 2009, doi:10.1016/j.actamat.2009.04.16.
Kwon et al., "Wear Behavior of Fe-Based Bulk Metallic Glass Composites", Journal of Alloys and Compounds, Jul. 14, 2011, vol. 509S, pp. S105-S108, doi:10.1016/j.jallcom.2012.12.108.
Launey et al., "Fracture toughness and crack-resistance curve behavior in metallic glass-matrix composites", Applied Physics Letters, Jun. 18, 2009, vol. 94, pp. 241910-1-241910-3, DOI: 10.1063/1.3156026.
Launey et al., "Solution to the Problem of the Poor Cyclic Fatigue Resistance of Bulk Metallic Glasses", PNAS Early Edition, pp. 1-6, Jan. 22, 2009, www.pnas.org/cgi/doi/10.1073/pnas.0900740106.
Lee et al., "Effect of a controlled volume fraction of dendritic phases on tensile and compressive ductility in La-based metallic glass matrix composites", Acta Materialia, vol. 52, Issue 14, Jun. 17, 2004, pp. 4121-4131, doi:10.1016/j.actamat.2004.05.025.
Lee et al., "Nanomechanical properties of embedded dendrite phase and its influence on inelastic deformation of $Zr_{55}Al_{10}Ni_5Cu_{30}$ glassy alloy", Materials Science and Engineering A, Mar. 25, 2007, vol. 375, pp. 945-948, doi:10.1016/j.msea.2006.02.014.
Li et al., "Selective laser melting of Zr-based bulk metallic glasses: Processing, microstructure and mechanical properties", Materials and Design, Sep. 21, 2016, vol. 112, pp. 217-226, http://dx.doi.org/10.1016/j.matdes.2016.09.071.
Li et al., "Wear Behavior of Bulk $Zr_{41}Ti_{14}Cu_{12.5}Ni_{10}Be_{22.5}$ Metallic Glasses", J. Mater. Res., Aug. 2002, vol. 17, No. 8, pp. 1877-1880.
Lillo et al., "Microstructure, Processing, Performance Relationships for High Temperature Coatings", U.S. Department of Energy, Office of Fossil Energy, under DOE Idaho Operations Office, Contract DE-AC07-05ID14517; Jul. 1, 2008, 22nd Annual Conference on Fossil Energy Materials, Pittsburgh, U.S., 8 pgs.

(56) References Cited

OTHER PUBLICATIONS

Lin et al., "Designing a toxic-element-free Ti-based amorphous alloy with Yemarkable supercooled liquid region for biomedical application", Intermetallics, Jul. 9, 2014, vol. 55, pp. 22-27, http://dx.doi.org/10.1016/j.intermet.2014.07.003.

List et al., "Impact Conditions for Cold Spraying of Hard Metallic Glasses", Journal of Thermal Spray Technology, Jun. 1, 2012, vol. 21, No. 3-4, pp. 531-540, DOI: 10.1007/s11666-012-9750-5.

Liu et al., "Influence of Heat Treatment on Microstructure and Sliding Wear of Thermally Sprayed Fe-Based Metallic Glass Coatings", Tribol. Lett., Mar. 4, 2012, vol. 46, pp. 131-138, DOI: 10.1007/s11249-012-9929-4.

Liu et al., "Metallic Glass Coating on Metals Plate by Adjusted Explosive Welding Technique", Applied Surface Science, Jul. 16, 2009, vol. 255, pp. 9343-9347, doi:10.1016/j.apsusc.2009.07.033.

Liu et al., "Microstructure and Properties of Fe-Based Amorphous Metallic Coating Produced by High Velocity Axial Plasma Spraying", Science Direct, Journal of Alloys and Compounds, Apr. 23, 2009, vol. 484, pp. 300-307, doi: 10.1016/j.jallcom.2009.04.086.

Liu et al., "Sliding Tribological Characteristics of a Zr-based Bulk Metallic Glass Near the Glass Transition Temperature", Tribol. Lett., Jan. 29, 2009, vol. 33, pp. 205-210.

Liu et al., "Wear Behavior of A Zr-Based Bulk Metallic Glass and Its Composites", Journal of Alloys and Compounds, May 5, 2010, vol. 503, pp. 138-144, doi:10.1016/j.jallcom.2010.04.2170.

Lu et al., "Crystallization Prediction on Laser Three-Dimensional Printing of Zr-based Bulk Metallic Glass", Journal of Non-Crystalline Solids, 2017, vol. 461, pp. 12-17, available online Jan. 29, 2017, http://dx.doi.org/10.1016/j.jnoncrysol.2017.01.038.

Lupoi et al., "Deposition of Metallic Coatings on Polymer Surfaces Using Cold Spray", Science Direct, Surface & Coatings Technology, Sep. 6, 2010, vol. 205, pp. 2167-2173, doi:10.1016/j.surfcoat.2010.08.128.

Ma et al., "Wear Resistance of Zr-Based Bulk Metallic Glass Applied in Bearing Rollers", Materials Science and Engineering, May 4, 2004, vol. A386, pp. 326-330.

Maddala et al., "Effect of Notch Toughness and Hardness on Sliding Wear of $Cu_{50}hf_{41.5}a_{18.5}$ Bulk Metallic Glass", Scripta Materialia, Jul. 6, 2011, vol. 65, pp. 630-633, doi: 10.1016/j.scriptamat.2011.06.046.

Madge, "Toughness of Bulk Metallic Glasses", Metals, Jul. 17, 2015, vol. 5, Issue 3, pp. 1279-1305, ISSN 2075-4701, doi:10.3390/met5031279.

Mahbooba et al., "Additive manufacturing of an iron-based bulk metallic glass Targer than the critical casting thickness", Applied Materials Today, Feb. 27, 2018, vol. 11, pp. 264-269, https://doi.org/10.1016/j.apmt.2018.02.011.

Narayan et al., "On the hardness and elastic modulus of bulk metallic glass matrix composites", Scripta Materialia, Jun. 9, 2010, vol. 63, Issue 7, pp. 768-771, doi:10.1016/j.scriptamat.2010.06.010.

Nl et al., "High Performance Amorphous Steel Coating Prepared by HVOF Thermal Spraying", Journal of Alloys and Compounds, 2009, vol. 467, pp. 163-167, doi:10.1016/j.jallcom.2007.11.133.

Nishiyama et al., "Recent progress of bulk metallic glasses for strain-sensing devices", Materials Science and Engineering: A, Mar. 25, 2007, vols. 449-451, pp. 79-83, doi:10.1016/j.jmsea.2006.02.384.

Oh et al., "Microstructure and tensile properties of high-strength high-ductility Ti-based amorphous matrix composites containing ductile dendrites", Acta Materialia, Sep. 23, 2011, vol. 59, Issue 19, pp. 7277-7286, doi:10.1016/j.actamat.201.08.006.

Parlar et al., "Sliding Tribological Characteristics of Zr-Based Bulk Metallic Glass", Intermetallics, Jan. 2008, vol. 16, pp. 34-41, doi:10.1016/j.intermet.2007.07.001.

Pauly et al., "Modeling Deformation Behavior of Cu—Zr—Al Bulk Metallic Glass Matrix Composites", Applied Physics Letters, Sep. 2009, vol. 95, pp. 101906-1-101906-3, doi:10.1063/1.3222973.

Pauly et al., "Processing Metallic Glasses by Selective Laser Melting", Materials Today, Jan./Feb. 2013, vol. 16, pp. 37-41 http://dx.org/10.1016/j.mattod.2013.01.018.

Pauly et al., "Transformation-mediated ductility in CuZr-based bulk metallic glasses", Nature Materials, May 16, 2010, vol. 9, Issue 6, pp. 473-477, DOI:10.1038/NMAT2767.

Ponnambalam et al., "Fe-Based Bulk Metallic Glasses with Diameter Thickness Larger Than One Centimeter", J Mater Res, Feb. 17, 2004. vol. 19; pp. 1320-1323, DOI: 10.1557/JMR.2004.0176.

Porter et al., "Incorporation of Amorphous Metals into MEMS for High Performance and Reliability", Rockwell Scientific Company, Final Report, Nov. 1, 2003, 41 pgs.

Prakash et al., "Sliding Wear Behavior of Some Fe-, Co-and Ni-Based Metallic Glasses During Rubbing Against Bearing Steel", Tribology Letters, May 1, 2000, vol. 8, pp. 153-160.

Qiao et al., "Development of plastic Ti-based bulk-metallic-glass-matrix composites by controlling the microstructures", Materials Science and Engineering: A, Aug. 20, 2010, vol. 527, Issues 29-30, pp. 7752-7756, doi:10.1016/j.msea.2010.08.055.

Qiao et al., "Metallic Glass Matrix Composites", Materials Science and Engineering, Feb. 2016, vol. 100, pp. 1-69, http://dx.doi.org.10.10163/jmser.2015.12.001.

Ramamurty et al., "Hardness and Plastic Deformation in a Bulk Metallic Glass", Acta Materialia, Feb. 2005, vol. 53, pp. 705-717, doi:10.1016/j.actamat.20004.10.023.

Revesz et al., "Microstructure and Morphology of Cu—Zr—Ti Coatings Produced by Thermal Spray and Treated by Surface Mechanical Attrition", Science Direct, Journal of Alloys and Compounds, Jul. 14, 2011, vol. 509S, pp. S482-S485, doi:10.1016/j.jallcom.2010.10.170.

Rigney et al., "The Evolution of Tribomaterial During Sliding: A Brief Introduction", Tribol. Lett, Jul. 1, 2010, vol. 39, pp. 3-7, DOI: 10.1007/s11249-009-9498-3.

Roberts, "Developing and Characterizing Bulk Metallic Glasses for Extreme Applications", XP055731434, Retrieved from the Internet (Dec. 16, 2013) URL:https://thesis.library.caltech.edu/8049/141/Scott_Roberts_thesis_2013_Complete_Thesis.pdf [retrieved on Sep. 17, 2020].

Roberts et al., "Cryogenic Charpy Impact Testing of Metallic Glass Matrix Composites", Scripta Materialia, Nov. 11, 2011, 4 pgs., doi:10.1016/j.scriptamat.2011.01.011.

Sanders et al., "Stability of Al-rich glasses in the Al—La—Ni system", Intermetallics, 2006, vol. 14, pp. 348-351, doi:10.1016/j.intermet.2005.06.009.

Schuh et al., "A Survey of Instrumented Indentation Studies on Metallic Glasses", J. Mater. Res., Jan. 2004, vol. 19, No. 1, pp. 46-57.

Segu et al., "Dry Sliding Tribological Properties of Fe-Based Bulk Metallic Glass", Tribol. Lett., Apr. 28, 2012, vol. 47, pp. 131-138, DOI: 10.1007/s11249-012-9969-9.

Shen et al., "3D printing of large, complex metallic glass structures", Materials and Design, Mar. 2017, vol. 117, pp. 213-222, http://dx.doi.org/10.1016/j.matdes.2016.12.087.

Shen et al., "Exceptionally High Glass-Forming Ability of an Fecocrmocby Alloy", Applied Physics, Apr. 5, 2005, vol. 86, pp. 151907-1-151907-3, DOI: 10.1063/1.1897426.

Singer et al., "Wear behavior of triode-sputtered MoS2 coatings in dry sliding contact with steel and ceramics", Wear, Jul. 1996, vol. 195, Issues 1-2, pp. 7-20.

Sinmazcelik et al., "A review: Fibre metal laminates, background, bonding types and applied test methods", Materials and Design, vol. 32, Issue 7, 3671, Mar. 4, 2011, pp. 3671-3685, doi:10.1016/j.matdes.2011.03.011.

Song et al., "Strategy for pinpointing the formation of B2 CuZr in metastable CuZr-based shape memory alloys", Acta Materialia, Aug. 6, 2011, vol. 59, pp. 6620-6630, doi:10.1016/j.actamat.2011.07.017.

Sun et al., "Fiber metallic glass laminates", J. Mater. Res., Dec. 2010, vol. 25, No. 12, pp. 2287-2291, DOI: 10.1557/JMR.2010.0291.

Sundaram et al., "Mesoscale Folding, Instability, and Disruption of Laminar Flow in Metal Surfaces", Physical Review Letters, Sep. 7, 2012, vol. 109, pp. 106001-1-106001-5, DOI: 10.1103/PhysRevLett.109.106001.

(56) References Cited

OTHER PUBLICATIONS

Szuecs et al., "Mechanical Properties of $Zr_{56.2}Ti_{13.8}Nb_{5.0}Cu_{6.9}Ni_{5.6}Be_{12.5}$ Ductile Phase Reinforced Bulk Metallic Glass Composite", Acta Materialia, Feb. 2, 2001, vol. 49, Issue 9, pp. 1507-1513.

Tam et al., "Abrasion Resistance of Cu Based Bulk Metallic Glasses", Journal of Non-Crystalline Solids, Oct. 18, 2004, vol. 347, pp. 268-272, doi:10.1016/j.noncrysol.2004.09.008.

Tam et al., "Abrasive Wear of $Cu_{60}Zr_{30}Ti_{10}$ Bulk Metallic Glass", Materials Science and Engineering, Apr. 1, 2004, vol. A384 pp. 138-142, doi:10.1016/j.msea.2004.05.73.

Tan et al., "Synthesis of La-based in-situ bulk metallic glass matrix composite", Intermetallics, Nov. 2002, vol. 10, Issues 11-12, pp. 1203-1205.

Tao et al., "Effect of Rotational Sliding Velocity on Surface Friction And Wear Behavior in Zr-Based Bulk Metallic Glass", Journal of Alloys and Compounds, Mar. 4, 2010, vol. 492, pp. L36-L39, doi:10.1016/j.jallcom.2009.11.113.

Tao et al., "Influence of Isothermal Annealing on the Micro-Hardness and Friction Property in Cuzral Bulk Metallic Glass", Advanced Materials Research, Jan. 1, 2011, vols. 146-147, pp. 615-618, doi:10.4028/www.scientific.net/AMR.146-147.615.

Tobler et al., "Cryogenic Tensile, Fatigue, and Fracture Parameters for a Solution-Annealed 18 Percent Nickel Maraging Steel", Journal of Engineering Materials and Technology, Apr. 1, 1978, vol. 100, pp. 189-194.

Wagner, "Mechanical Behavior of 18 Ni 200 Grade Maraging Steel at Cyrogenic Temperatures", J Aircraft, Nov. 1, 1986, vol. 23, No. 10, pp. 744-749.

Wang et al., "Progress in Studying the Fatigue Behavior of Zr-Based Bulk-Metallic Glasses and Their Composites", Intermetallics, Mar. 6, 2009, vol. 17, pp. 579-590, doi:10.1016/j.intermet.2009.01.017.

Whang et al., "Microstructures and age hardening of rapidly quenched Ti—Zr—Si alloys", Journal of Materials Science Letters, 1985, vol. 4, pp. 883-887.

Wu et al., "Bulk Metallic Glass Composites with Transformation-Mediated Work-Hardening and Ductility", Adv. Mater., Apr. 26, 2010, vol. 22, pp. 2770-2773, DOI: 10.1002/adma.201000482.

Wu et al., "Dry Sliding tribological behavior of Zr-based bulk metallic glass", Transactions of Nonferrous Metals Society of China, Jan. 16, 2012, vol. 22, Issue 3, pp. 585-589, DOI: 10.1016/S10003-6326(11)61217-X.

Wu et al., "Effects of Environment on the Sliding Tribological Behaviors of Zr-Based Bulk Metallic Glass", Intermetallics, Jan. 27, 2012, vol. 25, 115-125, doi:10.1016/j.intermet.2011.12.025.

Wu et al., "Formation of Cu—Zr—Al bulk metallic glass composites with improved tensile properties", Acta Materialia 59, Feb. 19, 2011, pp. 2928-2936, doi:10.1016/j.actamat.2011.01.029.

Wu et al., "Use of rule of mixtures and metal volume fraction for mechanical property predictions of fibre-reinforced aluminum laminates", Journal of Materials Science, vol. 29, issue 17, 4583, Jan. 1994, 9 pages.

Yao et al., "Fe-Based Bulk Metallic Glass with High Plasticity", Applied Physics Letters, Feb. 5, 2007, vol. 90, 061901, doi: 10.1063/1.2437722.

Yin et al., "Microstructure and Mechanical Properties of a Spray-Formed Ti-Based Metallic Glass Former Alloy", Journal of Alloys and Compounds, Jan. 25, 2012, vol. 512, pp. 241-245, doi:10.1016/j.jallcom.2011-09.074.

Zachrisson et al., "Effect of Processing on Charpy Impact Toughness of Metallic Glass Matrix Composites", Journal of Materials Research, May 28, 2011, vol. 26, No. 10, pp. 1260-1268, DOI: 10.1557/jmr.2011.92.

Zhang et al., "Abrasive and Corrosive Behaviors of Cu—Zr—Al—Ag—Nb Bulk Metallic Glasses", Journal of Physics: Conference Series, 2009, vol. 144, pp. 1-4, doi:10.1088/1742-6596/1441/1/012034.

Zhang et al., "Grain morphology control and texture characterization of laser solid formed $Ti_6Al_2Sn_2Zr_3Mo_{1.5}Cr_2Nb$ titanium alloy", Journal of Materials Processing Technology, Elsevier, NL, vol. 238, Jul. 8, 2016, pp. 202-211, XP029700970, ISSN: 0924-0136, DOI: 10.1016/J.JMATPROTEC.2016.07.011.

Zhang et al., "Robust Hydrophobic Fe-Based Amorphous Coating by Thermal Spraying", Applied Physics Letters, Sep. 20, 2012, vol. 101, pp. 121603-1-121603-4.

Zhang et al., "Wear Behavior of a Series of Zr-Based Bulk Metallic Glasses", Materials Science and Engineering, Feb. 25, 2008, vol. A475, pp. 124-127, doi: 10.1016/j.msea.2007.05.039.

Zheng et al., "Processing and Behavior of Fe-Based Metallic Glass Components via Laser-Engineered Net Shaping", Metallurgical and Materials Transactions A, 40A, 1235-1245, DOI: 10.1007/s11661-009-9828-y.

Zhou et al., "Microstructure and Electrochemical Behavior of Fe-Based Amorphous Metallic Coatings Fabricated by Atmospheric Plasma Spraying", Journal of Thermal Spray Technology, Jan. 2011, vol. 20, No. 1-2, pp. 344-350, DOI: 10.1007/s11666-010-9570-4.

Zhu et al., "Ta-particulate reinforced Zr-based bulk metallic glass matrix composite with tensile plasticity", Scripta Materialia, Mar. 2010, vol. 62, Issue 5, pp. 278-281, doi:10.1016/j.scriptamat.2009.11.018.

Zhuo et al., "Ductile Bulk Aluminum-Based Alloy with Good Glass-Forming Ability and High Strength", Chinese Physics Letters, 2009, vol. 26, No. 6, pp. 066402-1-066402-4.

Zhuo et al., "Spray Formed Al-Based Amorphous Matrix Nanocomposite Plate", Journal of Alloys and Compounds, Mar. 1, 2011, vol. 509, pp. L169-L173, doi:10.1016/j.jallcom.2011.02.125.

Prior Art $$R_p = K_{1C}^2 / \pi \sigma_y^2$$

$R_p$ = plastic zone size, $K_{1C}$ = fracture toughness, $\sigma_y$ = yield stress

| Brittle Materials | $K_{1C}$ (MPa m$^{1/2}$) | $R_P$ (μm) |
|---|---|---|
| BMG's | 3-50 | 1-100 |
| Oxide Glasses | < 5 | < 1 |
| Ceramics | < 5 | < 1 |
| Bulk Nanomaterials | < 10 | < 10 |
| Intermetallics | < 10 | < 10 |

FIG. 5A

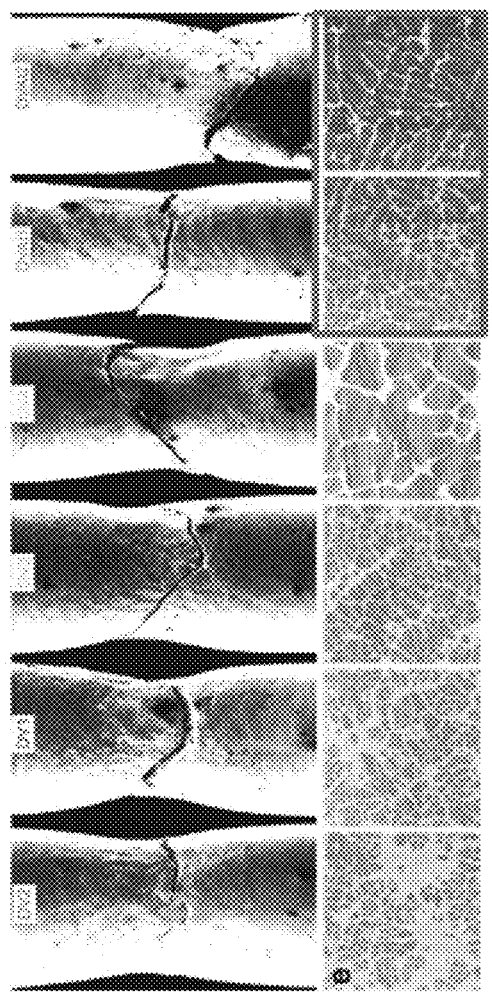

FIG. 5B

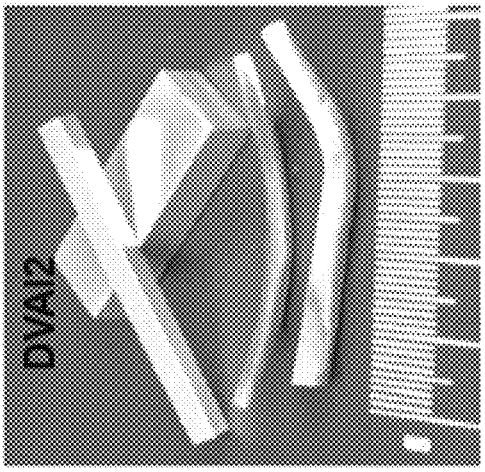

FIG. 5C

| name | atomic % | BMC (%) | bcc dendrite (%) | $\rho$ (g/cm³) | $\sigma_y$ (MPa) | $\sigma_{max}$ (MPa) | $\epsilon_y$ (%) | $\epsilon_{tot}$ (%) | $\sigma_{max}/\rho$ (MPa cm³/g) | RoA (%) | $K_{1C}$ (MPa m$^{1/2}$) | E (GPa) | G (GPa) | $\nu$ | $T_s$ (K) |
|---|---|---|---|---|---|---|---|---|---|---|---|---|---|---|---|
| DV2 | Ti$_{44}$Zr$_{30}$V$_{15}$Cu$_4$Be$_{10}$ | 70 | 30 | 5.13 | 1597 | 1614 | 2.1 | 9.5 | 315 | 34 | na | 94.5 | 34.8 | 0.358 | 956 |
| DV1 | Ti$_{45}$Zr$_{30}$V$_{15}$Cu$_5$Be$_{10}$ | 53 | 47 | 5.15 | 1362 | 1429 | 2.3 | 12.5 | 277 | 43 | 43.8 | 94.2 | 34.4 | 0.369 | 955 |
| DV3 | Ti$_{56}$Zr$_{18}$V$_{10}$Cu$_4$Be$_{12}$ | 46 | 54 | 5.08 | 1308 | 1309 | 2.2 | 8.6 | 258 | 31 | 47.4 | 84.0 | 30.5 | 0.379 | 951 |
| DV4 | Ti$_{62}$Zr$_{15}$V$_{10}$Cu$_4$Be$_9$ | 40 | 60 | 5.03 | 1086 | 1089 | 2.1 | 9.8 | 217 | 42 | 61.0 | 83.7 | 30.4 | 0.377 | 940 |
| DVAl1 | Ti$_{60}$Zr$_{16}$V$_9$Cu$_3$Al$_3$Be$_9$ | 31 | 69 | 4.97 | 1166 | 1189 | 2.0 | 9.3 | 239 | 27 | na | 84.2 | 31.0 | 0.360 | 901 |
| DVAl2 | Ti$_{67}$Zr$_{11}$V$_{10}$Cu$_4$Al$_2$Be$_3$ | 20 | 80 | 4.97 | 990 | 1000 | 2.0 | 8.4 | 201 | 28 | na | 78.7 | 28.6 | 0.370 | 899 |
| Ti-6-4a | Ti$_{86.1}$Al$_{10.3}$V$_{3.6}$ | na | na | 4.43 | 754 | 882 | 1.0 | 10.4 | 199 | 42 | 100.0 | 113.8 | 44.0 | 0.342 | 1877 |
| Ti-6-4s | Ti$_{86.1}$Al$_{10.3}$V$_{3.6}$ [Ref] | na | na | 4.43 | 1100 | 1170 | ~1 | ~10 | 264 | na | 43.0 | 114.0 | 44.0 | 0.330 | 1877 |
| CP-Ti | Ti$_{100}$ | na | na | 4.51 | 380 | 409 | 0.7 | 25.5 | 91 | 46 | 66.0 | 105.0 | 45.0 | 0.370 | ~1930 |

Prior Art

Prior Art

Prior Art

1. Design a composite system that chemically partitions into a dendrite and a glass-forming liquid
2. Lower the Shear Modulus of the inclusion (< the glass matrix)
3. Semi-solidly process to match the length scale of the inclusions with the plastic zone size of the glass matrix $(Zr_{45.2}Ti_{38.8}Nb_{8.7}Cu_{7.3})_{100-x}Be_x$ Cooling rate dependence of the dendrites from liquidus Prior Art

FIG. 14A

| Alloy | Tg (K) | Tx (K) | ΔT (K) | Tl (K) | Trg | $d_c$ (mm) |
|---|---|---|---|---|---|---|
| $Zr_{65.5}Cu_{22.4}Ni_{6.5}Al_{5.6}$ | 636 | 733 | 97 | 1211 | 0.525 | <6 |
| $Zr_{65.3}Cu_{20}Ni_{8.2}Al_{6.5}$ | 640 | 745 | 105 | 1188 | 0.539 | <6 |
| $Zr_{65}Cu_{17.5}Ni_{10}Al_{7.5}$ | 650 | 750 | 100 | 1153 | 0.564 | <6 |
| $Zr_{64.8}Cu_{13.5}Ni_{13.2}Al_{8.3}$ | 653 | 752 | 99 | 1143 | 0.572 | <6 |
| $Zr_{64.5}Cu_{13.1}Ni_{13.2}Al_{9.2}$ | 658 | 757 | 99 | 1138 | 0.578 | 6 |
| $Zr_{63.5}Cu_{7.6}Ni_{17.2}Al_{11.4}$ | 671 | 758 | 87 | 1153 | 0.582 | 6 |
| $Zr_{58.5}Nb_{2.8}Cu_{15.6}Ni_{12.8}Al_{10.3}$ | 674 | 776 | 102 | 1103 | 0.611 | >10 |
| $Zr_{57}Nb_5Cu_{15.4}Ni_{12.6}Al_{10}$ | 687 | 751 | 64 | 1092 | 0.63 | 10 |
| $Zr_{57}Ti_5Cu_{20}Ni_8Al_{10}$ | 676 | 725 | 49 | 1095 | 0.62 | 10 |
| $Zr_{53}Ti_5Cu_{16}Ni_{10}Al_{16}$ | 697 | 793 | 96 | 1118 | 0.62 | 8 |
| $Zr_{61.88}Cu_{18}Ni_{10.12}Al_{10}$ | 653 | 744 | 91 | | | >5 |
| $Zr_{64.13}Cu_{15.75}Ni_{10.12}Al_{10}$ | 643 | 745 | 102 | | | >5 |
| $Zr_{62}Cu_{15.5}Ni_{12.5}Al_{10}$ | 652 | 748 | 96 | | | >5 |

FIG. 14B

| Alloy | Tg (K) | Tx (K) | ΔT (K) | Tl (K) | Trg | $d_c$ (mm) |
|---|---|---|---|---|---|---|
| $Zr_{60}Nb_5Cu_{22.5}Pd_5Al_{7.5}$ | 683 | 722 | 39 | | | >3 |
| $Zr_{60}Ti_6Cu_{19}Fe_5Al_{10}$ | 645 | 699 | 54 | | | >3 |
| $Zr_{60}Nb_5Cu_{20}Fe_5Al_{10}$ | 623 | 722 | 99 | | | >3 |
| $(Zr_{62}Cu_{23}Fe_5Al_{10})$ | 651 | 751 | 100 | 1186 | 0.549 | 3 |
| $(Zr_{62}Cu_{23}Fe_5Al_{10})_{99}Ag_1$ | 656 | 753 | 97 | 1175 | 0.558 | 4 |
| $(Zr_{62}Cu_{23}Fe_5Al_{10})_{97}Ag_3$ | 658 | 743 | 85 | 1181 | 0.557 | 10 |
| $(Zr_{62}Cu_{23}Fe_5Al_{10})_{95}Ag_5$ | 663 | 747 | 84 | 1189 | 0.551 | 5 |
| $(Zr_{62}Cu_{23}Fe_5Al_{10})_{93}Ag_7$ | 664 | 751 | 87 | 1191 | 0.558 | 4 |
| $Zr_{58}Cu_{22}Co_4Fe_4Al_{12}$ | 673 | 788 | 115 | 1217 | 0.55 | 5 |
| $Zr_{58}Cu_{22}Co_4Ag_4Al_{12}$ | 679 | 761 | 82 | 1183 | 0.57 | 5 |
| $Zr_{58}Cu_{22}Co_2Ag_6Al_{12}$ | 675 | 751 | 76 | 1227 | 0.55 | 5 |
| $Zr_{58}Cu_{22}Ag_4Fe_2Al_{12}$ | 675 | 757 | 82 | 1205 | 0.56 | 5 |
| $Zr_{58}Cu_{22}Ag_6Fe_2Al_{12}$ | 676 | 748 | 72 | 1227 | 0.55 | 5 |

FIG. 14C

HIGH TOUGHNESS METALLIC GLASS-BASED COMPOSITES FOR ADDITIVE MANUFACTURING

CROSS-REFERENCE TO RELATED APPLICATIONS

This application is a continuation of U.S. patent application Ser. No. 15/996,913, filed Jun. 4, 2018, which claims priority to U.S. Provisional Application No. 62/514,653, filed Jun. 2, 2017, the disclosures of which are incorporated herein by reference in their entireties.

STATEMENT OF FEDERAL FUNDING

The invention described herein was made in the performance of work under a NASA contract NNN12AA01C, and is subject to the provisions of Public Law 96-517 (35 USC 202) in which the Contractor has elected to retain title.

FIELD OF THE INVENTION

The present invention generally relates to bulk metallic glass matrix composite materials with enhanced strength and toughness, methods of their additive manufacture, and parts manufactured therefrom and thereby.

BACKGROUND OF THE INVENTION

Bulk metallic glasses (BMGs), also known as amorphous or glassy metals, are alloys which can be quenched into a vitreous state at a relatively large casting thickness (generally over 1 mm). In turn, BMG matrix composites (BMGMCs) are two-phase materials, comprising a crystalline/dendrite phase dispersed within a high strength metallic glass matrix, wherein the crystalline phase is, typically, grown in situ via chemical segregation during the alloy's cooling from melt in casting.

Metal additive manufacturing, also commonly known as metal 3D printing, is an emerging manufacturing technology, which is being rapidly integrated into commercial applications, such as fabrication of nozzles in aircraft and rocket engines. Typically, a 3D printing process comprises sequential deposition of a multitude of thin layers of a material to assemble a desired bulk (or net-shape) part or structure. The most common forms of metal additive manufacturing are based on either powder bed systems or powder feed systems. In 3D printing based on powder bed systems, a laser or electron beam melts a thin layer of metal powder and continuously applies it to construct the part, which becomes buried in the powder. The most common forms of powder bed systems are direct metal laser sintering (DMLS) or selective laser melting (SLM). In contrast, in printing systems based on powder feed systems, metal powder is blown into a laser or electron beam and deposited as a metal pool. In addition, there exist 3D printing systems in which a metal is deposited directly from a building head in the absence of a powder bed. Such bed-less technologies are termed directed energy deposition (DED), of which the most common form is laser engineered net shaping (LENS). Other common forms of metal additive manufacturing are deposition, thermal spray additive manufacturing, laser foil welding, and ultrasonic additive manufacturing. Recently, it has been shown that bulk metallic glass parts can also be fabricated by additive manufacturing instead of casting.

SUMMARY OF THE INVENTION

Embodiments according to the disclosures generally relate to bulk metallic glass matrix composite materials with enhanced strength and toughness, methods of their additive manufacture, and parts manufactured therefrom and thereby.

Many embodiments according to the disclosure are directed to methods for forming a bulk metallic glass matrix composite utilizing powder-based additive manufacturing including:
  mixing a powder of a bulk metallic glass composition with a powder of at least one additional metallic composition wherein the at least one additional metallic composition forms a reinforcing crystalline ductile phase configured to inhibit crack propagation in a bulk metallic glass matrix formed from the bulk metallic glass composition, and wherein the volume fraction of the at least one metallic crystalline phase is from between 15-95% by volume of the bulk metallic glass matrix composite;
  melting the mixed powder of the bulk metallic glass composition and the at least one additional metallic composition using an additive manufacturing heating source such that the at least one additional metallic composition is partially melted such that a native oxide layer disposed within the bulk metallic glass matrix composition is dissolved; and
  solidifying the melt formed from the mixed powders in a layer by layer printing process to form the bulk metallic glass matrix composite having at least one property selected from the group of a porosity of equal to or less than 2% by volume, an overall strength of at least 50% of the strength of the bulk metallic glass composition when formed into a bulk part, a fracture toughness that is at least 5% larger than bulk metallic glass composition, a tension ductility that is at least 1% larger than the bulk metallic glass composition, and a notch toughness larger than 40 MPa m$^{1/2}$ when measured in a part formed from a bulk metallic glass composition with a notch radius of 100 micrometers.

In many other embodiments, the layer by layer solidification process is selected from the group of powder bed fusion, selective laser melting, direct metal laser sintering, direct energy deposition, electron beam fabrication, thermal spray additive manufacturing, cold spray additive manufacturing and binder jetting.

In still many other embodiments, the powder of the bulk metallic glass composition powder and the powder of the at least one additional metallic composition are mixed before solidification.

In yet many other embodiments, the bulk metallic glass composition powder particle size is within 20% of the particle size of the at least one additional metallic composition powder.

In still yet many other embodiments, the solidified bulk metallic glass matrix composite has a strength of greater than 1 GPa.

In still yet many other embodiments, the solidified bulk metallic glass matrix composite has a ductility in tension of greater than 4%.

In still yet many other embodiments, the fracture toughness of the solidified bulk metallic glass matrix composite exceeds 80 MPa m$^{1/2}$.

In still yet many other embodiments, the at least one additional metallic composition does not substantially alter the glass forming ability of the bulk metallic glass composition.

In still yet many other embodiments, the method further includes machining or finishing the solidified bulk metallic glass matrix composite to smooth the surface thereof.

In still yet many other embodiments, the bulk metallic glass matrix composite is applied to a crystalline metal surface.

In still yet many other embodiments, the hardness of the at least one additional metallic composition is at least 5% lower than the hardness of the bulk metallic glass composition.

In still yet many other embodiments, the shear modulus of the at least one additional metallic composition is lower than the shear modulus of the bulk metallic glass composition.

In still yet many other embodiments, the stiffness of the at least one additional metallic composition is lower than the stiffness of the bulk metallic glass composition.

In still yet many other embodiments, the at least one additional metallic composition is a crystalline metal that exhibits greater than 5% ductility in tension as a monolithic part.

In still yet many other embodiments, the at least one additional metallic composition is comprised of the same primary metal element as the bulk metallic glass composition.

In still yet many other embodiments, the bulk metallic glass composition is selected such that its most abundant metal is selected from the group of Ti, Zr, Hf, Fe, Co, Ni, Pd, Pt, Cu, Ag, Au, and Al.

In still yet many other embodiments, the bulk metallic glass composition comprises Zr—Cu—Al.

In still yet many other embodiments, the bulk metallic glass composition is a Ti-based metallic glass with a density of less than 5.5 g/cm$^3$.

In still yet many other embodiments, the bulk metallic glass composition is Zr-based and the at least one additional metallic composition is Ti or Zr based alloyed with one or more of V, Nb, Ta, Mo or Fe.

In still yet many other embodiments, the bulk metallic glass matrix composite may comprise one of the following: is based on Ti and has a density of less than 6 g/cm$^3$, is based on Ti and the at least one additional metallic composition is based on Ti, is based on Fe and the at least one additional metallic composition is based on Fe.

In still yet many other embodiments, the bulk metallic glass composition is Fe—Ni—B—X, where X is one or more additional components, and the at least one additional metallic composition is based in Fe.

In still yet many other embodiments, the bulk metallic glass composition is based on Al, and the at least one additional metallic composition is based on Al.

In still yet many other embodiments, the bulk metallic glass matrix composite is printed into a three-dimensional object selected from the group of watches, jewelry, electronic cases, structural components, gears, and kinetic rounds.

In still yet many other embodiments, the volume fraction of the at least one additional metallic composition is varied throughout the solidified bulk metallic glass matrix composite.

In still yet many other embodiments, the at least one additional metallic composition comprises a refractory metal phase selected from the group of W, Mo, Hf, or Ta.

In still yet many other embodiments, the solidified bulk metallic glass matrix composite is formed as a net shape part.

In still yet many other embodiments, a dendrite phase forms in the bulk metallic glass matrix during melting and solidification from a component dissolved from the at least one additional metallic composition having low solubility in the bulk metallic glass composition.

In still yet many other embodiments, the solidified bulk metallic glass matrix composite comprises three phases: the bulk metallic glass matrix, the reinforcing crystalline ductile phase, and a dendritic phase distributed throughout the bulk metallic glass matrix.

In still yet many other embodiments, the compositions of the bulk metallic glass composition and the at least one additional metallic composition are selected such that when the at least one additional metallic composition is partially dissolved into the bulk metallic glass composition, the bulk metallic glass composition has improved glass forming ability.

In still yet many other embodiments, the at least one additional metallic composition contributes sufficient metal components to the bulk metallic glass composition during melting such that the bulk metallic glass matrix has improved glass forming ability when compared to the glass forming ability of the bulk metallic glass composition prior to melting.

Additional embodiments and features are set forth in part in the description that follows, and in part will become apparent to those skilled in the art upon examination of the specification or may be learned by the practice of the disclosed subject matter. A further understanding of the nature and advantages of the present disclosure may be realized by reference to the remaining portions of the specification and the drawings, which forms a part of this disclosure.

BRIEF DESCRIPTION OF THE DRAWINGS

These and other features and advantages of the present invention will be better understood by reference to the following detailed description when considered in conjunction with the accompanying data and figures, wherein:

FIGS. 5A to 5F provide data showing properties of BMGMCs and monolithic BMGs in accordance with the prior art.

FIGS. 14A to 14C provide tables of materials for use in BMGMCs in accordance with embodiments.

DETAILED DISCLOSURE

The embodiments of the invention described herein are not intended to be exhaustive or to limit the invention to precise forms disclosed. Rather, the embodiments selected for description have been chosen to enable one skilled in the art to practice the invention.

Turning to the data and figures, embodiments of methods and alloy systems for non-Be BMG matrix composite materials that can be used to additively manufacturing parts with superior mechanical properties, especially high toughness and strength, are provided. Alloys of embodiments are directed to BMGMC materials comprising a high strength BMG matrix reinforced with properly scaled, soft, crystalline metal inclusions dispersed throughout the matrix in a sufficient concentration to resist fracture.

Figure 1:
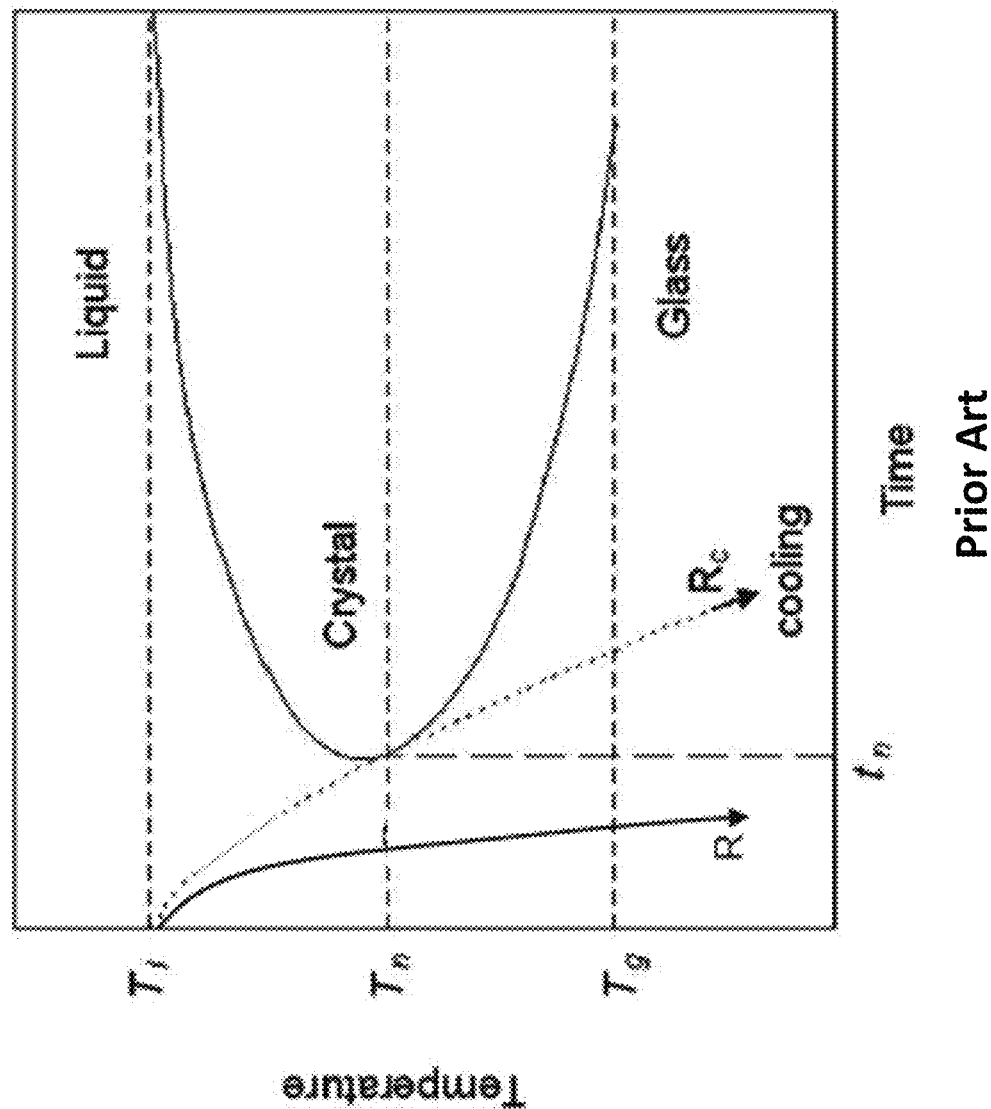
FIG. 1 provides a schematic of a temperature time diagram of the critical cooling rate for forming a metallic glass according to prior art.

Amorphous metals, also known as metallic glasses, are relatively new materials possessing a unique combination of advantageous properties that makes them attractive candidates for a wide variety of applications, including gears, cutting tools, bearings, electronic casings, jewelry, spacecraft components, and other useful parts and mechanisms. (See, e.g., U.S. patent application Ser. Nos. 13/928,109; 14/177,608; 14/259,608; 14/491,618; 15/062,989; and Ser. No. 15/918,831, the disclosures of which are incorporated herein by reference.) For example, these materials typically exhibit excellent corrosion and wear resistance, high strength and high hardness, yet, simultaneously, substantial elasticity. Moreover, manufacturing of parts from metallic glass alloys is, in principle, compatible with such straightforward processes as injection molding or similar casting processes. However, forming of amorphous metals into useful parts remains challenging, especially in the production of parts with dimensions exceeding 1 mm, due to the limitations associated with the need for extremely high cooling rates (i.e. critical cooling rate $R_c$) necessary for quenching of the metallic glass melts into vitreous state, wherein the glassy melt must be solidified faster than competing crystallization can occur, as depicted in FIG. 1.

In short, bulkier (thicker) parts, which require longer time to fully cool and solidify, are more difficult to manufacture without loss of advantageous properties afforded by the glassy phase. In addition, as can also be seen from FIG. 1, bulk metallic glasses are extremely sensitive to post-production heat treatments. For example, prolonged exposure of a metallic glass alloy to temperatures around its corresponding glass transition temperature will ultimately result in crystallization and loss of all advantageous properties.

One parameter used to characterize the glass forming ability (GFA) of a metallic glass alloy is the "critical rod dimeter" ($d_c$), wherein the better glass formers are able to yield thicker (i.e. having larger critical rod diameters), fully amorphous parts at a given cooling rate. Another way of framing the glass forming ability of an amorphous metal is by the minimum cooling rate $R_c$ required for a material to form an amorphous phase, wherein this "critical cooling rate" determines the types of manufacturing processes available. For example, very poor glass forming materials can have critical cooling rates as high as $10^{6°}$ C./s. Another parameter that relates to the glass forming of a material is fragility. Fragility characterizes how rapidly the dynamics of a material slow down as it is cooled toward the glass transition: materials with a higher fragility have a relatively narrow glass transition temperature range, while those with low fragility have a relatively broad glass transition temperature range. The most common definition of fragility is the "kinetic fragility index" m, which characterizes the slope of the viscosity (or relaxation time) of a material with temperature as it approaches the glass transition temperature from above. Physically, fragility may be related to the presence of dynamical heterogeneity in glasses, as well as to the breakdown of the usual Stokes-Einstein relationship between viscosity and diffusion.

Figure 2A:
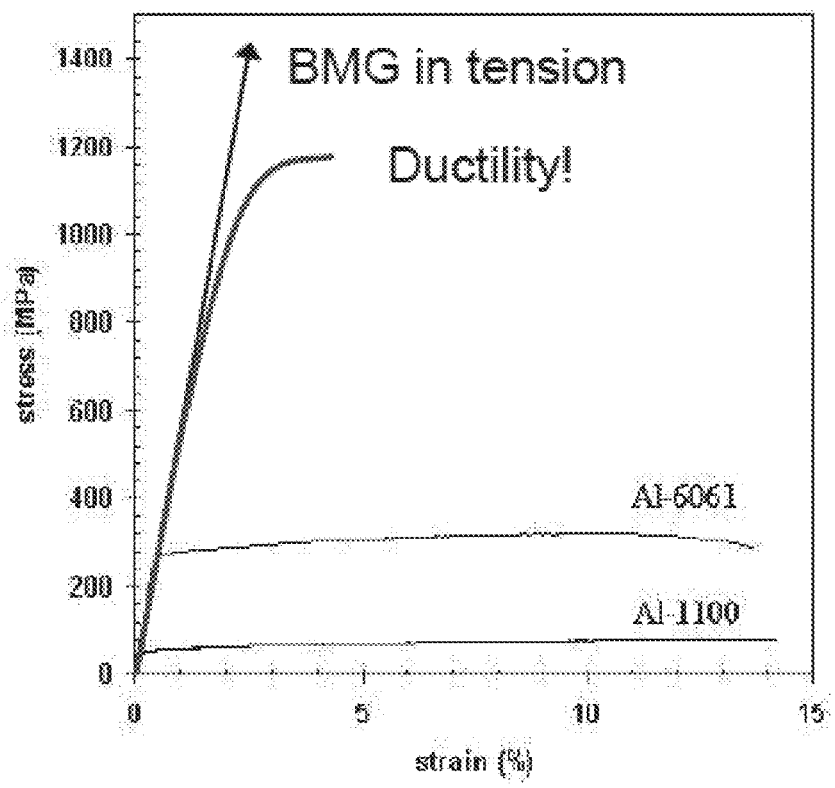
FIG. 2A compares mechanical properties of BMG alloys and conventional crystalline alloys.
Figure 2B:
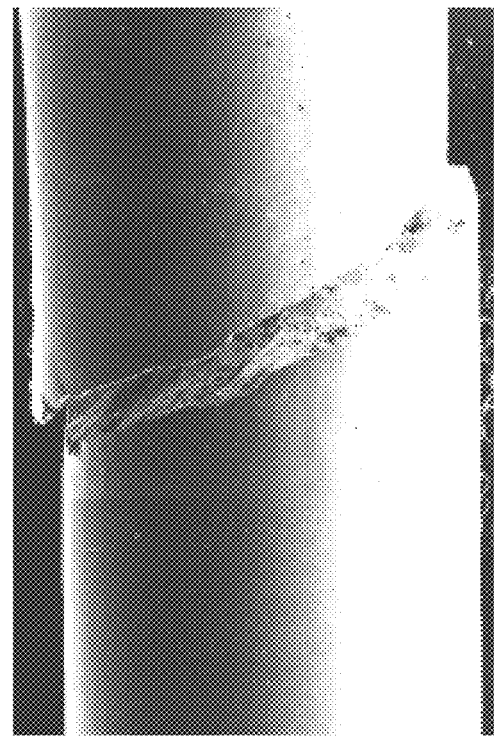
FIG. 2B provides an image illustrating a brittle fracture of a BMG alloy according to the prior art.
Figures 3A, 3B:
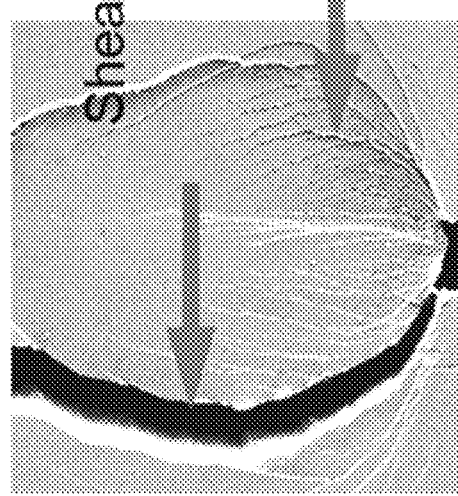
FIG. 3A provides a table showing fracture toughness and yield strength values for various materials according to the prior art.
FIG. 3B illustrates a fracture of a conventional BMG accordance to the prior art.

When a material is placed under stress and has reached the limit of its strength, it usually has the option of either deformation or fracture. A number of parameters may be used to describe the strength of metallic glasses when placed under stress, including: toughness, brittleness, fragility, etc. Toughness is the ability of a material to absorb energy and plastically deform without fracturing. One definition of material toughness is the amount of energy per unit volume that a material can absorb before rupturing. It is also defined as a material's resistance to fracture when stressed. Toughness generally requires a balance of strength and ductility. In general terms, a material is considered brittle if, when subjected to stress, it breaks without significant plastic deformation. Brittle materials, even those of high strength, absorb relatively little energy prior to fracture. FIGS. 2A and 2B illustrate that bulk metallic glasses typically have no ductility and are very brittle in tension, especially as compared to conventional crystalline aluminum alloys (FIG. 2A), breaking easily under stress as a result (FIG. 2B). Nevertheless, as illustrated in FIGS. 3A and 3B, BMGs are also high strength materials with large plastic zone size, capable of resisting crack formation. In other words, conventional BMGs are strong materials that are not prone to crack formation, however, once a crack does form within a BMG solid, it propagates effortlessly, due to the material's brittleness and results in a catastrophic failure.

Figure 4A:
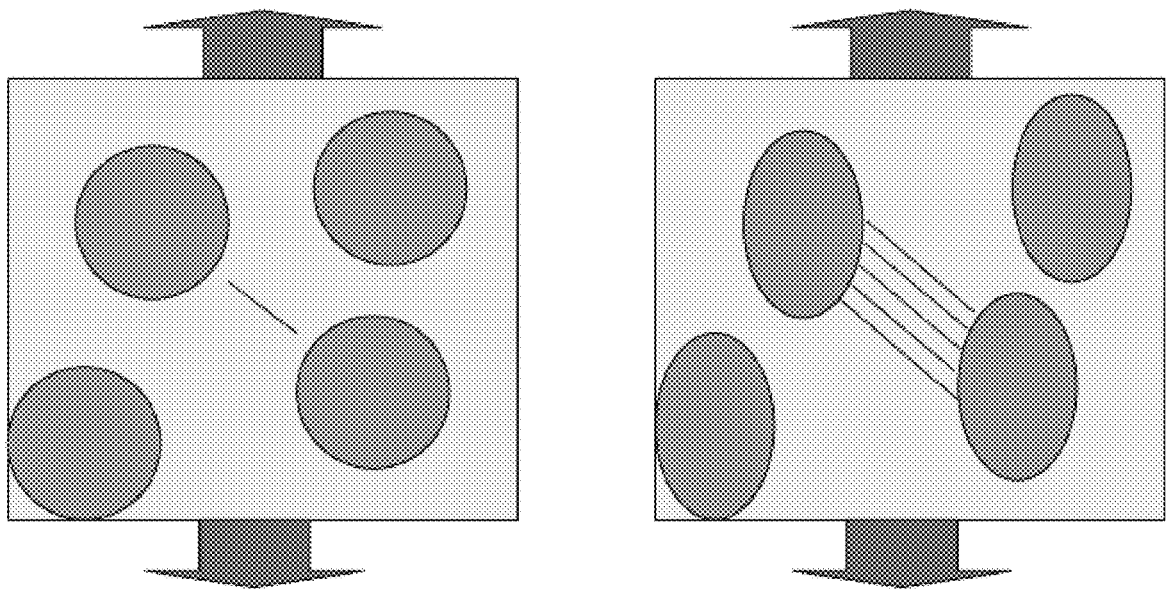
FIG. 4A provides a schematic diagram of composite materials in accordance with embodiments.
Figure 4B:
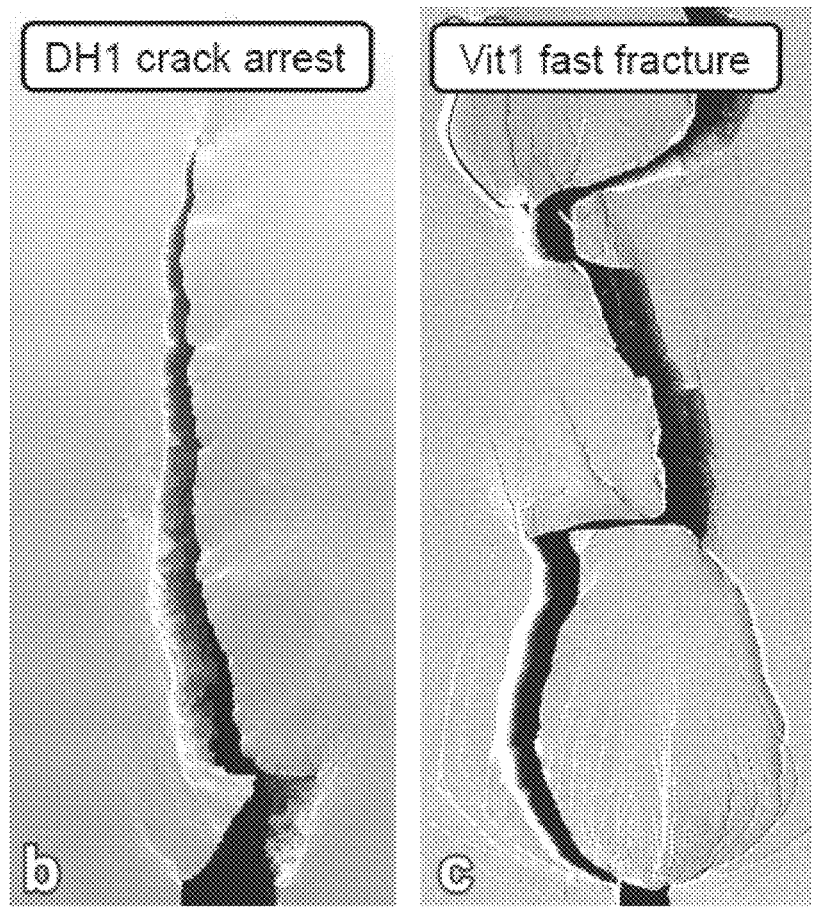
FIG. 4B provides images of fracture propagation in a composite metallic glass material (left), and a monolithic metallic glass material (right).

One approach to improving ductility and, therefore, toughness of BMG alloys is illustrated in FIG. 4A and comprises incorporation of soft, crack arresting inclusions into the hard but brittle BMG matrix, wherein the inclusions are size-scaled to match the plastic zone size of the glass matrix (FIGS. 3A and 3B). To this end, bulk metallic glass matrix composite (BMGMC) materials, wherein a strong bulk metallic glass matrix incorporates a dispersed soft, crystalline metal dendrite phase have been reported to possess unprecedented mechanical properties, especially as compared to monolithic BMG materials or even high performance conventional crystalline alloys like steel. For example, FIG. 4B demonstrates that dendrites of a BMGMC alloy DH1 (FIG. 4B, left) efficiently blunt a crack tip and arrest the crack growth, in contrast to the fatal failure of a monolithic BMG alloy Vit1 (FIG. 4B, right) to withstand cracking and fracture.

Figure 5D:
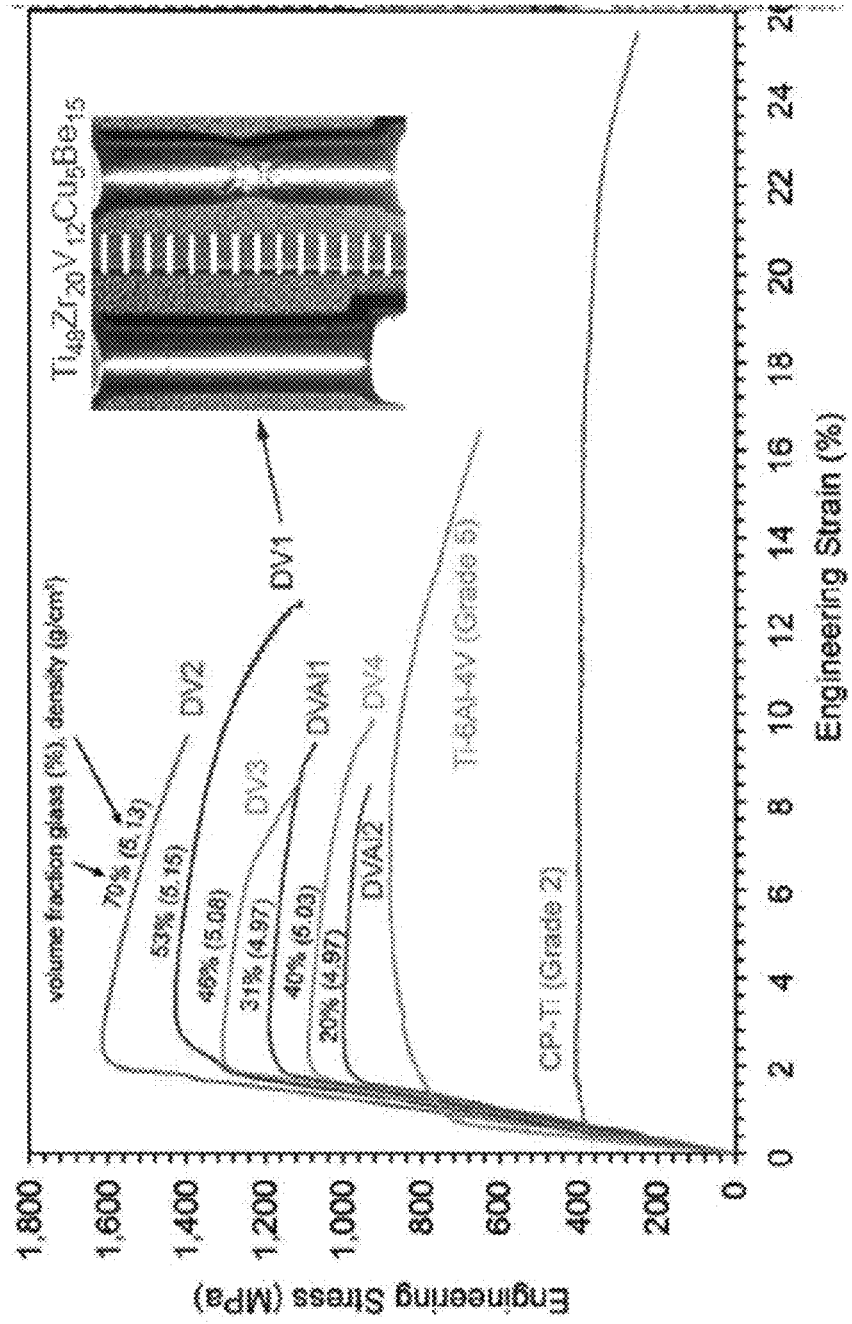
Figure 5E:
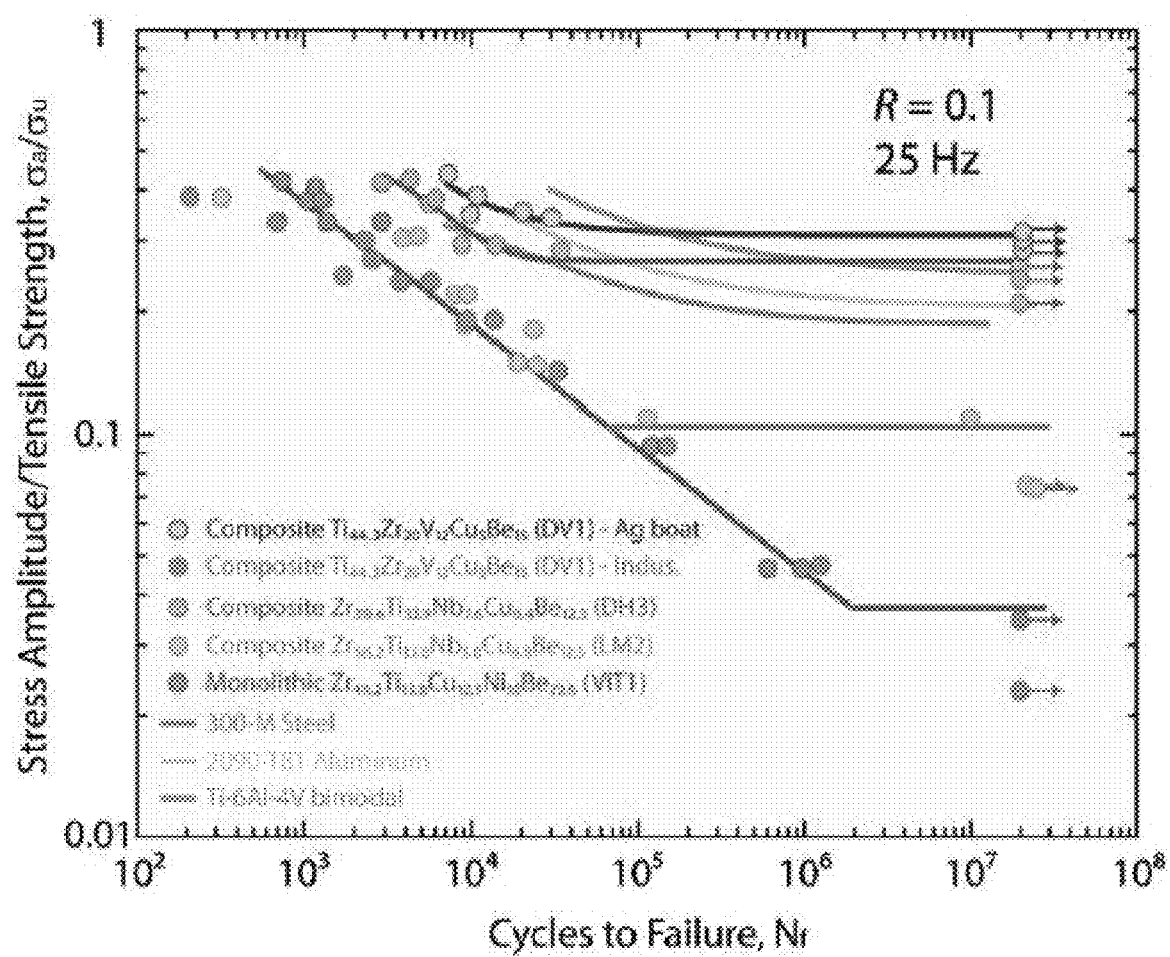
Figure 5F:
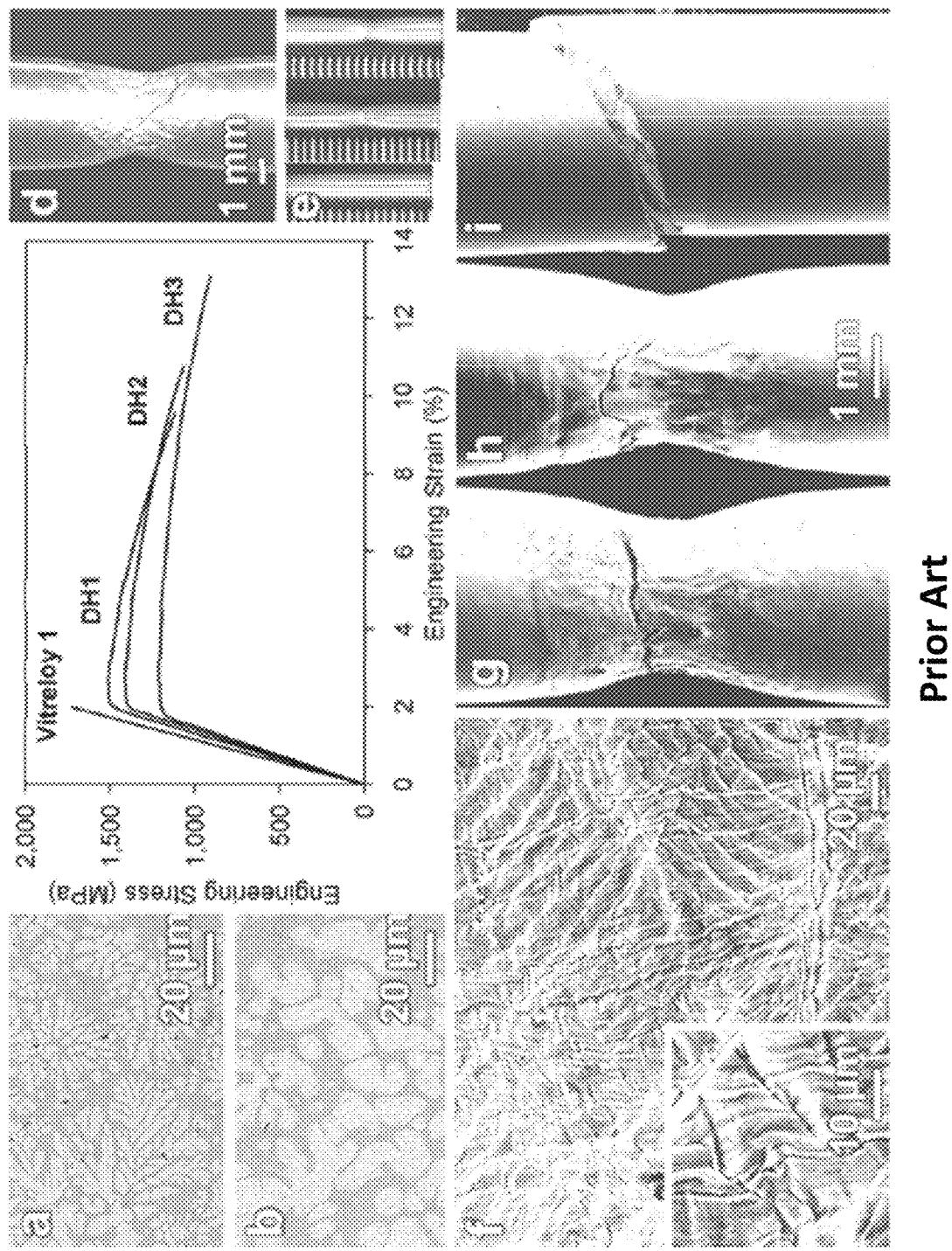
Figure 6A:
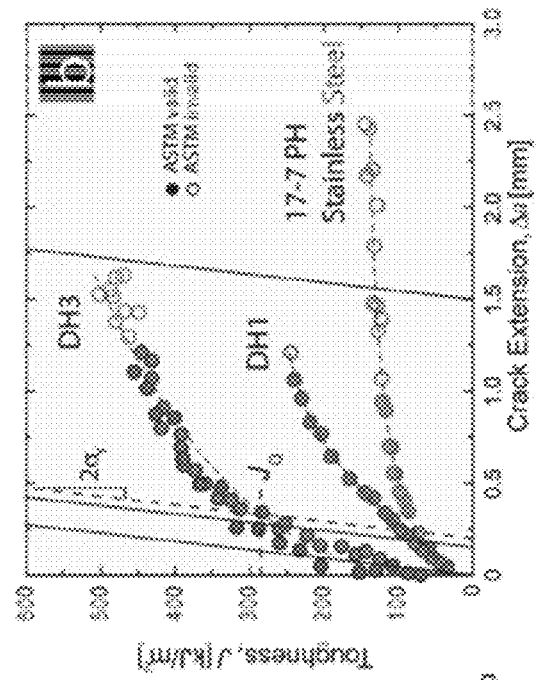
FIGS. 6A to 6C provide data showing properties of BMGMCs in accordance with the prior art.
Figure 6B:
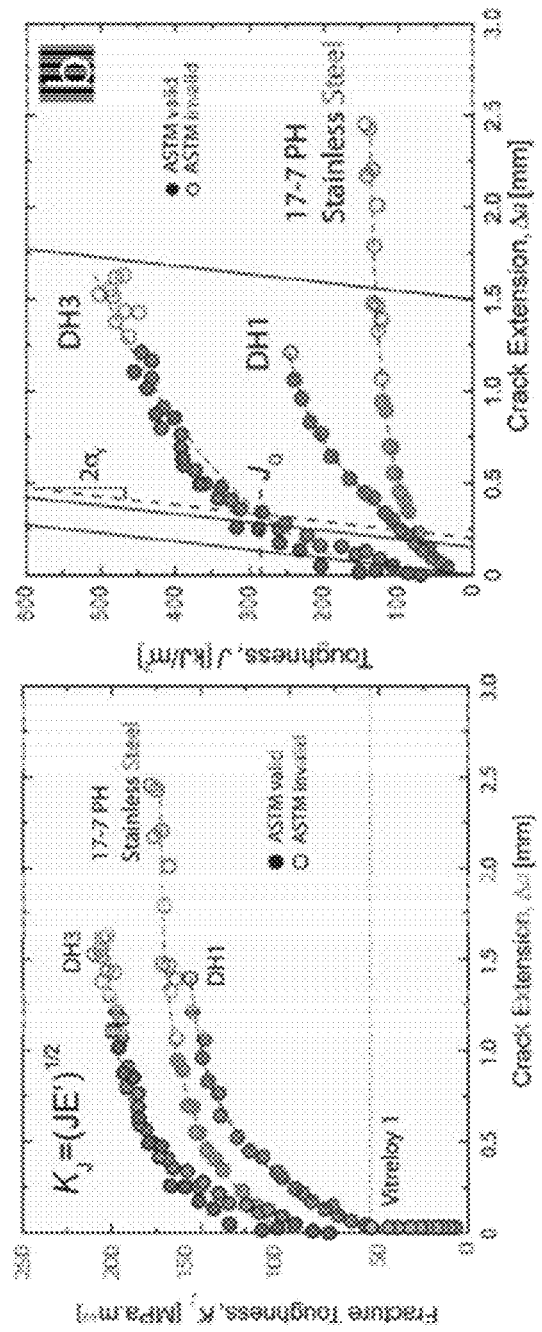
Figure 6C:
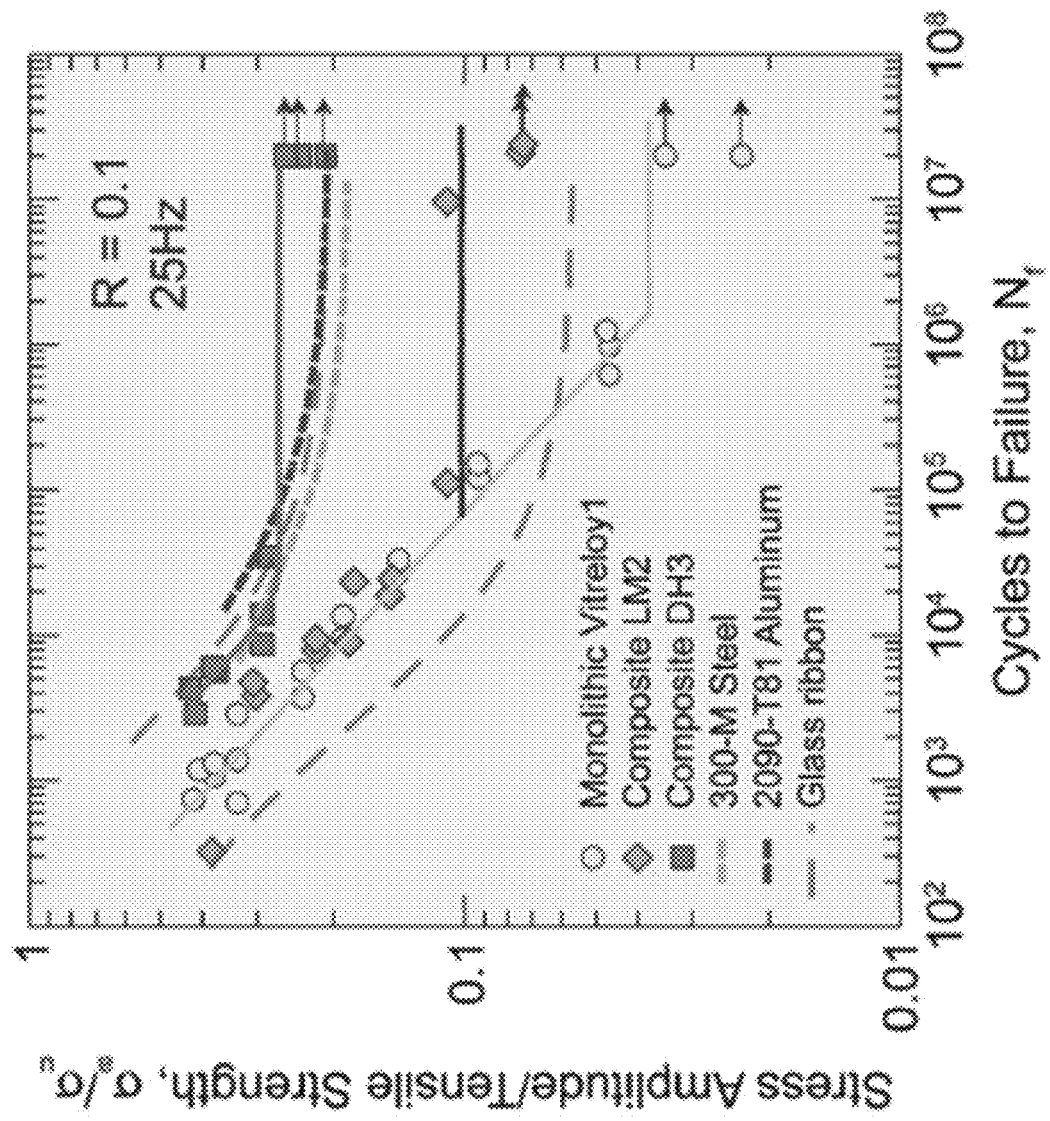

Hofmann et. al. have demonstrated that the mechanical properties of BMGMCs based on Zr—Ti—Be—X and Ti—Zr—Be—X alloy families (wherein X represents one or more β-stabilizing elements and/or other glass forming ability enhancing elements) can be enhanced beyond the expectations afforded by the simple rule of mixtures (Hofmann, et. al., PNAS, 105(51) 20136-20140 (2008) and Hofmann et. al., Nature (2007), the disclosures of which are incorporated herein by reference). Specifically, as illustrated in FIGS. 5A through 5F, Hofmann et. al. have shown that rational modifications to the BMGMC alloy's chemical composition, volume fraction size of the dendrite phase, modulus of the composite phases, and toughness of the metallic glass matrix—can all afford greatly enhanced mechanical properties. More specifically, Hofmann et. al. have developed a family of Ti—Zr—V—Cu—Be BMGMCs (the DV-DVAl family) with different dendrite volume fractions, wherein DV4, DVAl1 and DVAl2 all had >60% BCC dendrites (FIGS. 5A and 5C). The resulting alloys were not only amenable to cooling into billets larger than 1 cm thick (FIG. 5B), but also possessed a host of enhanced mechanical properties, as compared to traditional crystalline alloys, such as Ti alloys (FIGS. 5C through 5E) or monolithic BMGs (FIG. 5F). The excellent BMGMC properties reported by Hofmann et. al. included: yield strengths greater than 1.5 GPa, ductility greater than 5% in tension, fracture toughness values greater than 100 MPa $m^{1/2}$ (FIGS. 6A & 6B), fatigue endurance limits greater than 20% of the yield strength (FIG. 6C), and excessive ductility in bending.

Figure 7:
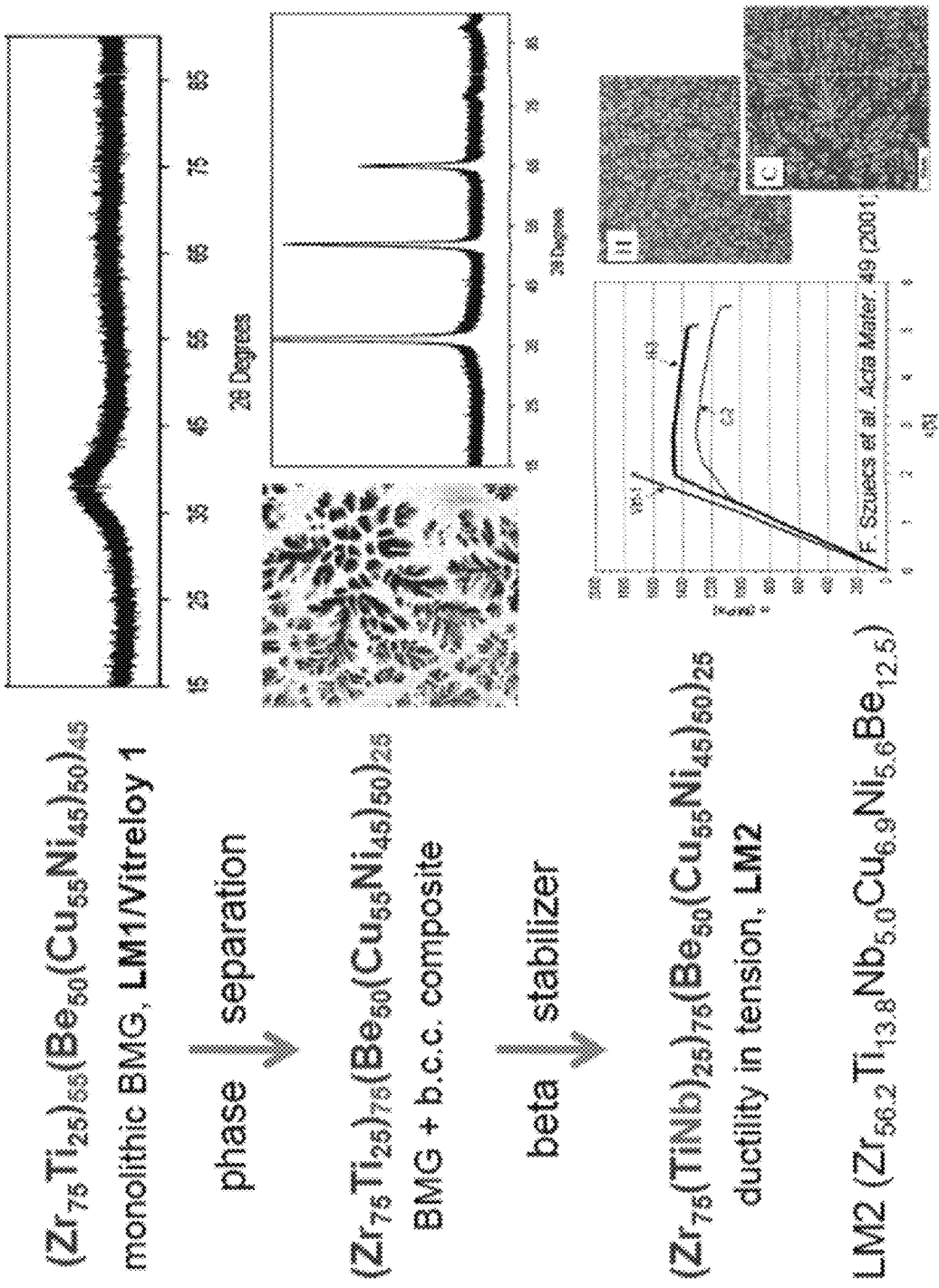
FIG. 7 provides data demonstrating the effect of beta stabilizers on the formation of composite materials in accordance with the prior art.
Figure 8:
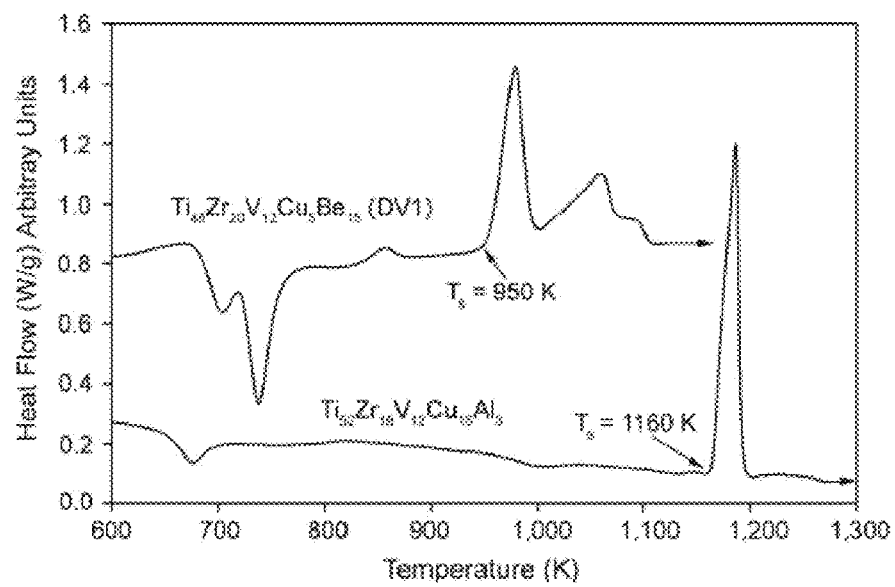
FIG. 8 provides a heat flow data graph of Zr and Ti-BMGMCs in accordance with the prior art.
Figure 9:
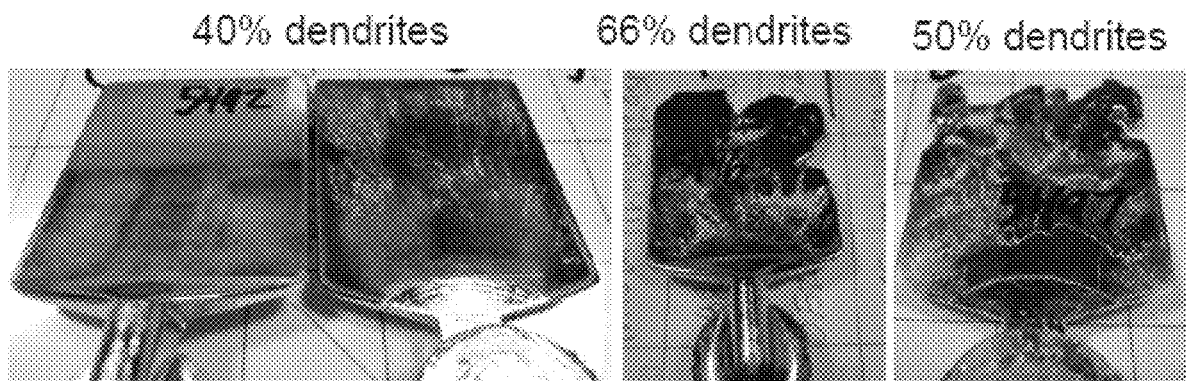
FIG. 9 provides images of cast parts of Zr and Ti-BMGMCs in accordance with the prior art.

Nevertheless, despite the many demonstrated advantages of Zr—Ti—Be—X and Ti—Zr—Be—X-based BMGMCs, their use in engineering applications has not become widespread due to the problems associated with alloy formulation and manufacturing. Specifically, the primary disadvantage of these alloys is that they usually contain beryllium, which is considered toxic, even in small amounts as a minor alloy component. However, Be has been considered necessary for ensuring good glass forming ability in the BMG matrix (ensuring $d_c$>1 mm), with no suitable alternatives available despite years of research. Moreover, in instances when BMGMC is formed in situ via phase separation of insoluble alloy components, Be is often necessary to promote and enhance the dendrite phase separation, as it has very low solubility in the BCC (β) allotropic form of Group 4 metals (i.e. Zr, Ti, Hf), which, in turn, are the most common BMGMC formers (as summarized in FIG. 7). In addition, removing Be dramatically increases the melting temperature of the alloy, making it difficult to cast. For example, FIG. 8 illustrates that substituting Be in alloy DV1 (as summarized in FIG. 5C) for Al to form $Ti_{52}Zr_{18}V_{12}Cu_{15}Al_3$, while maintaining approximately the same Ti—Zr—V presence and the same dendrite volume fraction, increases the solidus temperature by 210 degrees, making the new Al-containing alloy barely castable and no longer amorphous. Furthermore, dendrite-containing BMGMCs have very high viscosity (much higher than monolithic BMGs), making their casting problematic, especially in view of also higher melting temperatures. As such, mold casting of BMGMCs often leads to mold damage from overheating (which is necessary to lower the alloy viscosity) and poor quality, dull in their appearance, cast parts. For example, FIG. 9 demonstrates the challenges associated with casting BMGMC alloys that have a dendrite volume fraction of more than 50%, including the increase in cast part defects or incomplete casts. Accordingly, the manufacturing of parts from BMGMC alloys, wherein the parts are complex, Be-free, and possess desirable properties, such as high strength and toughness, remains unattainable with conventional die-casting or injection molding.

Embodiments of BMGMC Materials

Embodiments are generally directed to methods and alloy systems for non-Be BMG matrix composite materials that can be used to additively manufacture parts with superior mechanical properties, especially high toughness and strength. As discussed above, to date, the development of BMGMCs has primarily been restricted by the requirement that they are amenable to casting, and, therefore, efforts have focused on the alloys with good glass forming ability of the BMG matrix, facile phase separation of the dendrite phase, low melting temperature, and relatively low dendrite concentration. However, as also discussed above, the alloys obtained under such restrictions tend to be brittle, as their microstructures do not arrest the development of fatal cracks.

Figure 10A:
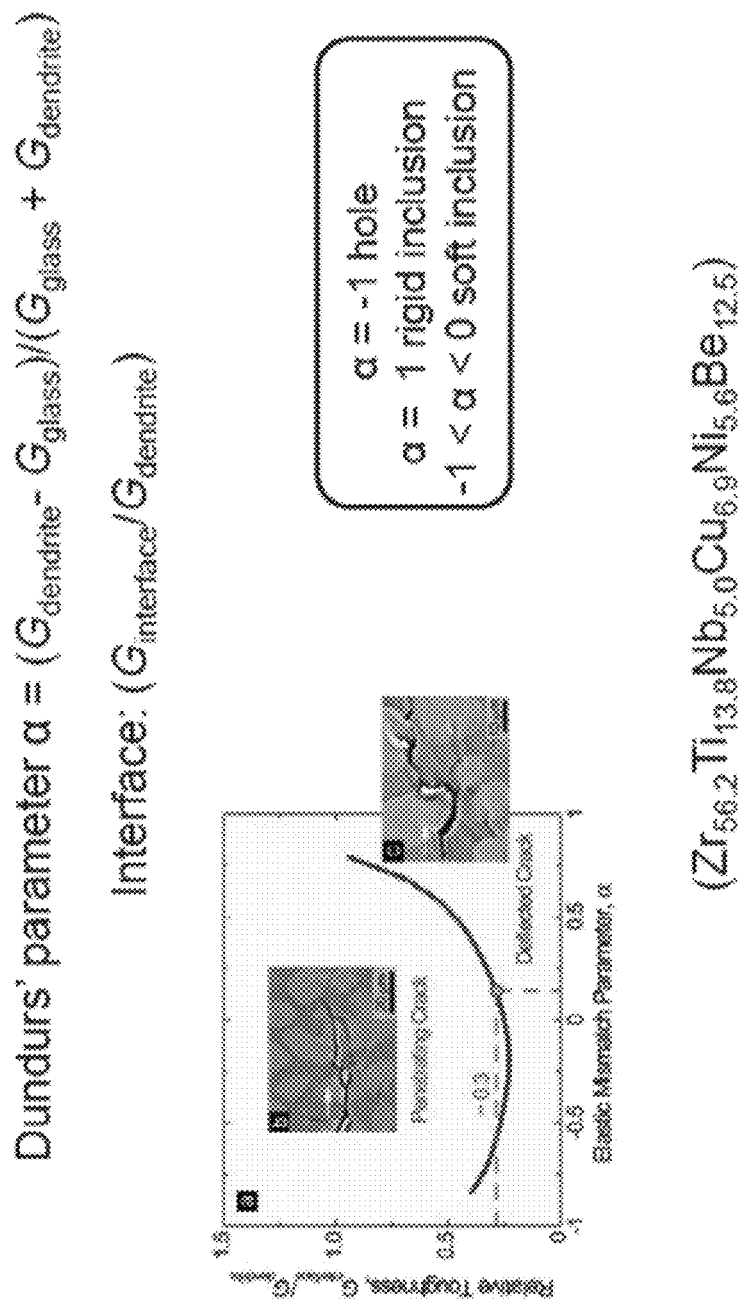
FIG. 10A provides data showing properties of toughness vs elastic mismatch.
Figure 10B:
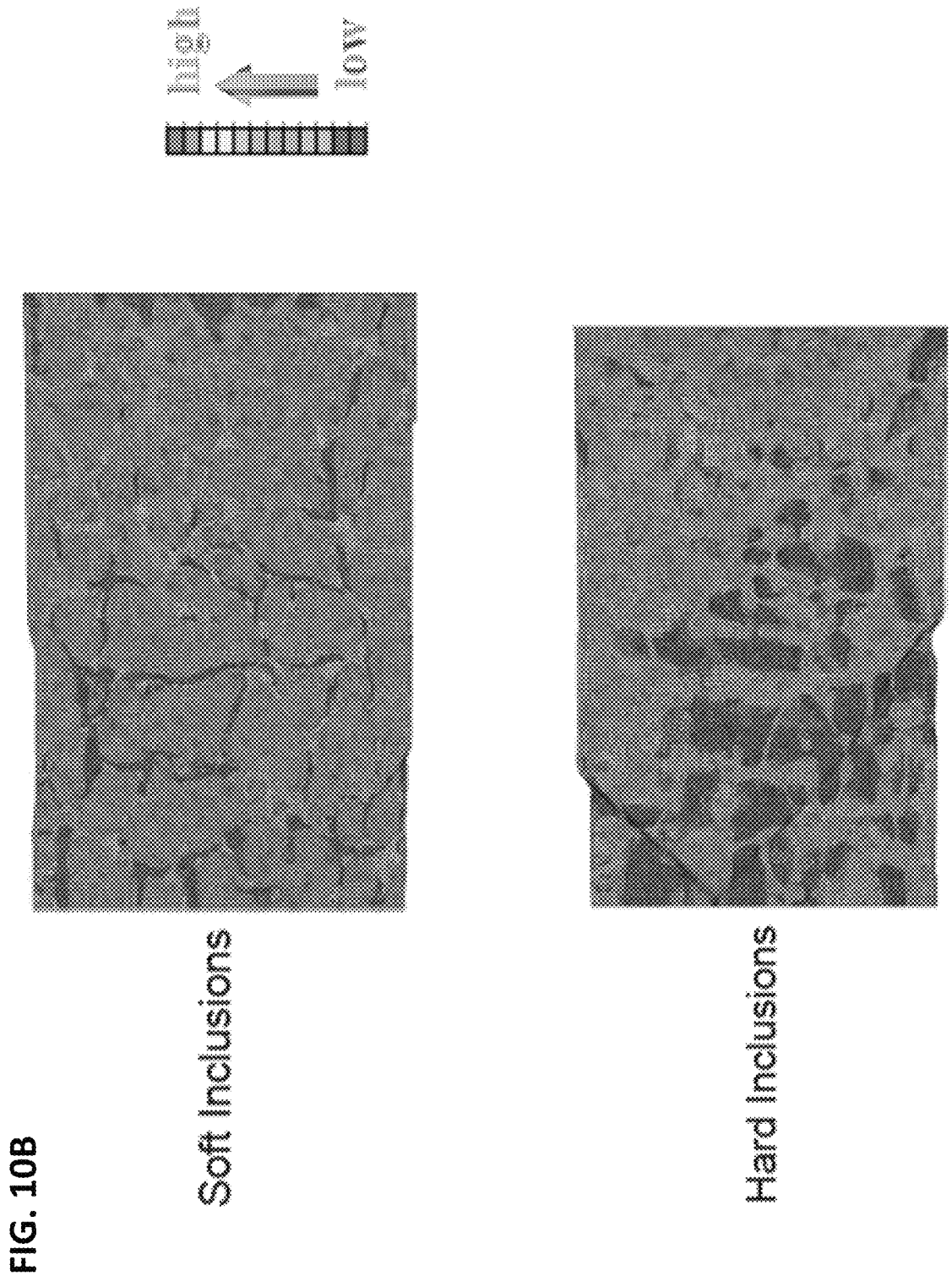
FIG. 10B provides micrograph images of composites comprising soft (top) and hard (bottom) inclusion in accordance with embodiments.

Accordingly, alloys of embodiments are directed to BMGMC materials comprising a high strength BMG matrix reinforced with properly scaled, soft, crystalline metal dendrite inclusions dispersed throughout the matrix in a sufficient concentration to resist fracture. In many embodiments, the BMG matrix and crystalline metal dendrite inclusions are selected such that there is the highest possible elastic (i.e. shear modulus) mismatch between the phases. Specifically, as shown in FIG. 10A using the first Dundurs' parameter it is possible to predict how the relative toughness of a composite will be impacted by the elastic mismatch between its phases. More specifically, higher relative toughness can be obtained where a soft dendrite phase is included in a harder matrix, and where the elastic mismatch parameter between the materials is maximized. (See, e.g., Launey, M. E., et al., PNAS, 106(13), pp. 4986-4991 (2009), the disclosure of which is incorporated herein by reference.) The difference in the way hard and soft inclusions develop boundary layers phases is shown in FIG. 10B.

Specifically, soft inclusions in a hard continuous matrix better prevents the propagation of fractures through the composite material by concentrating stress in the glass phase such that deformation initially occurs by necking (10A, top), as opposed to hard inclusions in which stress is concentrated in the crystalline phase and shear bands form along the amorphous phase by shear fracturing (10B, bottom). Accordingly, in many embodiments the elastic mismatch (Dundrus parameter α) between the matrix and the inclusions is less than 0, and in other embodiments less than −0.5. Other embodiments are directed to composite materials where the matrix phase is at least 5% harder than the crystalline phase, and is provided in sufficient concentration capable of resisting fracture.

As shown in the schematic provided in FIG. 4A, the composites according to embodiments generally comprise at least two phases: a soft crystalline phase (shown by the circles and voids) dispersed throughout a continuous high strength matrix phase. It has been shown that a certain minimum particle amount/volume fraction is required in the solidified alloy in order to achieve the desired crack suppression effect and, as a result, to minimize brittleness and acquire satisfactory ductility. Accordingly, in many embodiments the concentration of inclusions in the matrix is at least ~15% by volume or above, in other embodiments from ~15% by volume up to 95% by volume in order to ensure sufficient fracture toughness in the BMGMCs.

Turning to the compositions of the BMGMCs in accordance with embodiments, the combination of the BMG matrix material and the crystalline phase material may follow a number of possible compositional rules. In many embodiments, addition of the crystalline phase does not substantially alter the glass forming ability of the bulk metallic glass matrix composition. In many other embodiments, the hardness of the at least one additional metallic composition is at least 5% lower than the hardness of the bulk metallic glass matrix composition. In still other embodiments, the shear modulus of the at least one additional metallic composition is lower than the shear modulus of the bulk metallic glass matrix composition. In yet other embodiments the stiffness of the at least one additional metallic composition is lower than the stiffness of the bulk metallic glass matrix composition. In various embodiments, the at least one additional metallic composition is a crystalline metal that exhibits greater than 5% ductility in tension as a monolithic part. In various other embodiments the at least one additional metallic composition is comprised of the same primary metal element as the bulk metallic glass matrix composition.

Turning to the actual compositions of the composite materials, in many embodiments the bulk metallic glass matrix composition is selected such that its most abundant metal is selected from the group of Ti, Zr, Hf, Fe, Co, Ni, Pd, Pt, Cu, Ag, Au, and Al. In some embodiments the bulk metallic glass matrix composition is ZrCuAl. In other embodiments, the bulk metallic glass matrix composition is a Ti-based metallic glass with a density of less than 5.5 g/cm$^3$. Ins till other embodiments, the bulk metallic glass matrix composition is Zr-based and the at least one additional metallic composition forming the crystalline phase is Ti or Zr based alloyed with one or more of V, Nb, Ta, Mo or Fe. In many embodiments the crystalline phase may be formed of a refractory metal phase selected from the group pf W, Mo, Hf, or Ta. In various embodiments, the bulk metallic glass matrix composite may comprise one of the following: be based on Ti and have a density of less than 6 g/cm$^3$, be based on Ti and where the at least one additional metallic composition forming the crystalline phase is based on Ti, is based on Fe and the at least one additional metallic composition forming the crystalline phase is based on Fe. In some embodiments the bulk metallic glass matrix composition is Fe—Ni—B—X, and the at least one additional metallic composition forming the crystalline phase is based on Fe. In other embodiments, the bulk metallic glass matrix composition is based on Al, and the at least one additional metallic composition forming the crystalline phase is based on Al.

Embodiments of Methods for Forming BMGMC Materials

Figure 11:
FIG. 11 provides a process for forming BMGMCs by a semi-slid process in accordance with the prior art.
Figure 11:
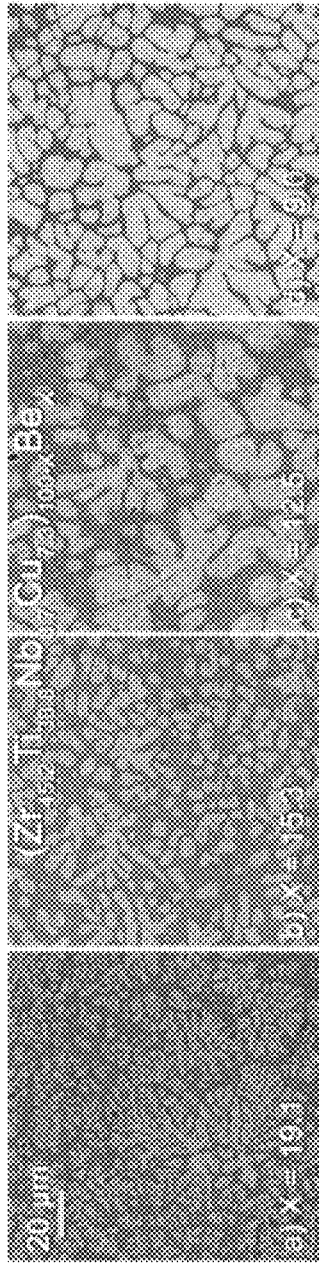
Figure 12:
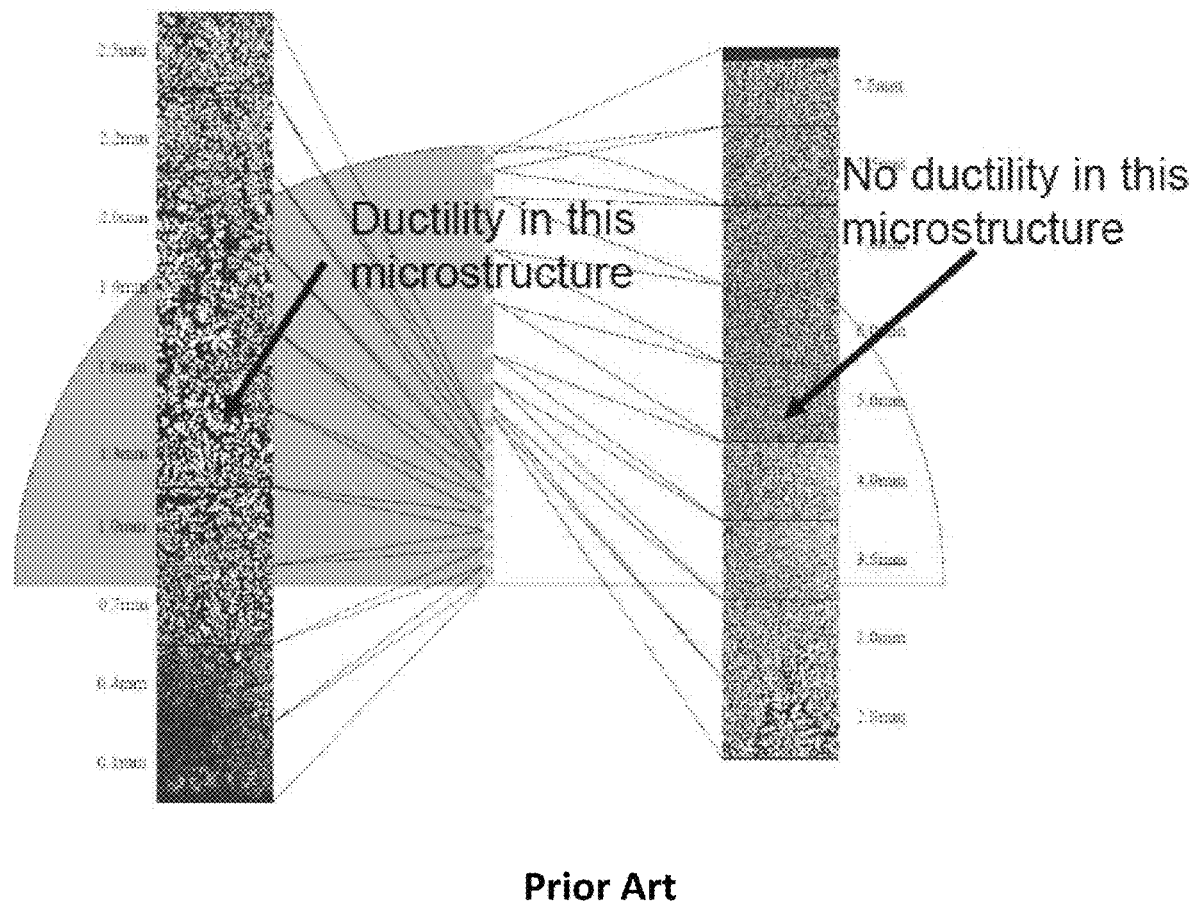
FIG. 12 provides a schematic showing the cooling rate dependence on dendrite size in accordance with the prior art.

As discussed above, the formation of successful BMGMC materials requires the ability to systematically control the concentration and size of particles in the metal matrix. Conventionally, the crystalline dendrite phase of the composite is formed in situ during casting (due to the segregation of specially added insoluble alloy components upon cooling and solidification of the cast melt). As summarized in FIG. 11, the best composite materials have been achieved by creating equilibrium composites where dendrites are in thermal equilibrium with the glass forming BMG liquid and their size is controlled through semi-solid processing, as shown in FIG. 12. These properties have been nearly impossible to replicate in other, non-Be BMGMCs, due to crystallization of the matrix and due to the wrong selection of the particles. Likewise, significant ductility in tension and fracture toughness has only been achieved in Be-containing BMGMCs. Moreover, the literature suggests that the excellent properties of BMGMCs can only be obtained using semi-solid (or isothermal) holds above the solidus temperature to coarsen the dendrites.

Figure 13:
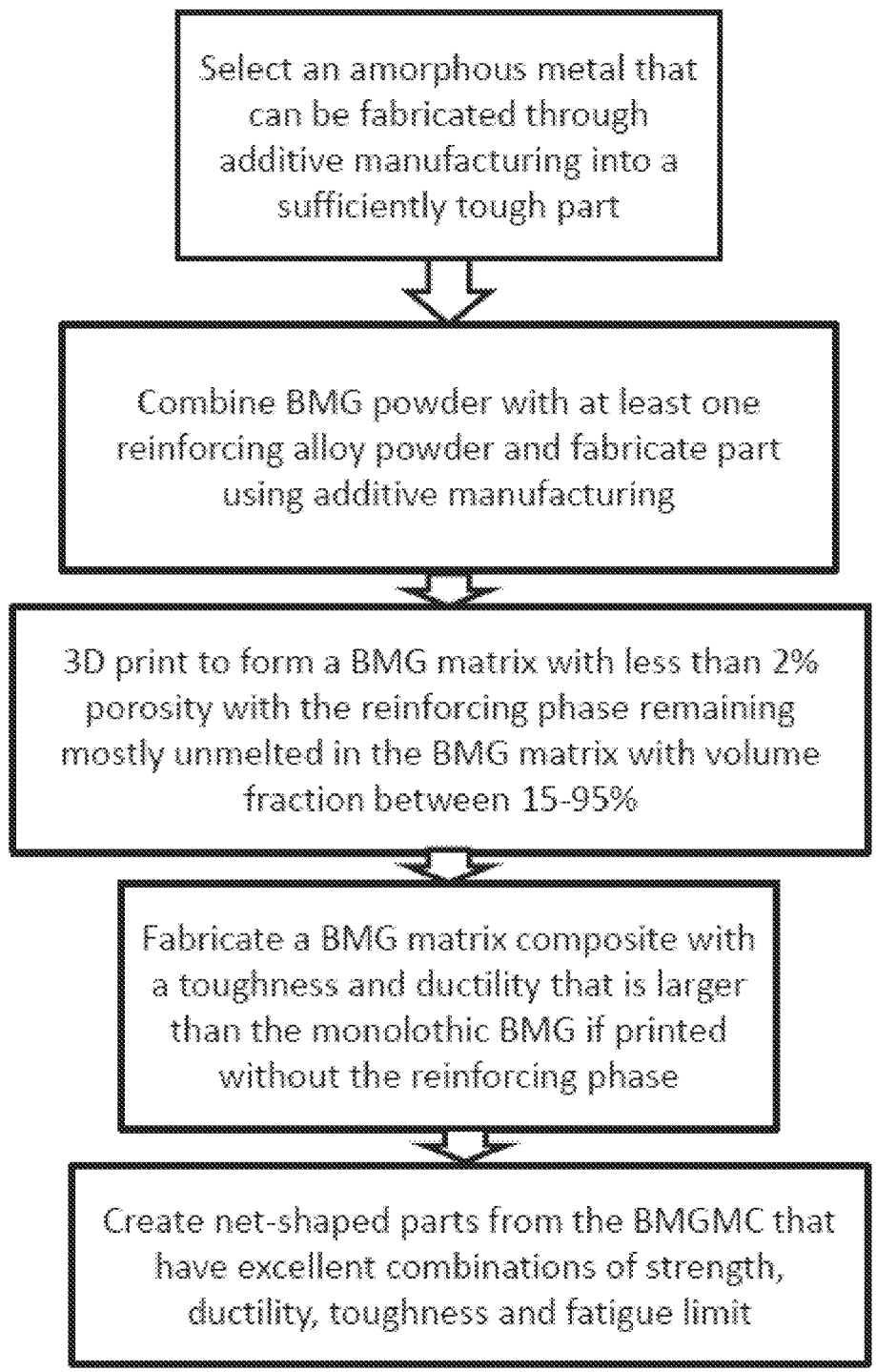
FIG. 13 provides a flow chart of a method of forming a BMGMC in accordance with embodiments.

In many embodiments, the BMGMC microstructures that lead to the advantageous alloy properties in the current disclosure are "synthesized" either in situ or ex situ using non-Be containing BMG powder for the matrix material, crystalline metal powder for the soft inclusions phase, and metal additive manufacturing. Accordingly, in many embodiments, the fabrication process comprises the steps tabulated in FIG. 13. As shown, in many embodiments, first, a BMG powder suitable for use with a powder utilizing metal additive manufacturing processes is selected. In many embodiments, the powder utilizing metal additive manufacturing processes of interest may include one of: powder bed fusion, direct metal laser sintering, direct energy deposition, laser engineered net shaping, thermal spray additive manufacturing, or another powder utilizing process. Such methods are in direct contrast to conventional semi-solid processes as with additive manufacturing there is no way to do semi-solid processing due to the rapid heating and cooling involved in the process.

Figure 14C:
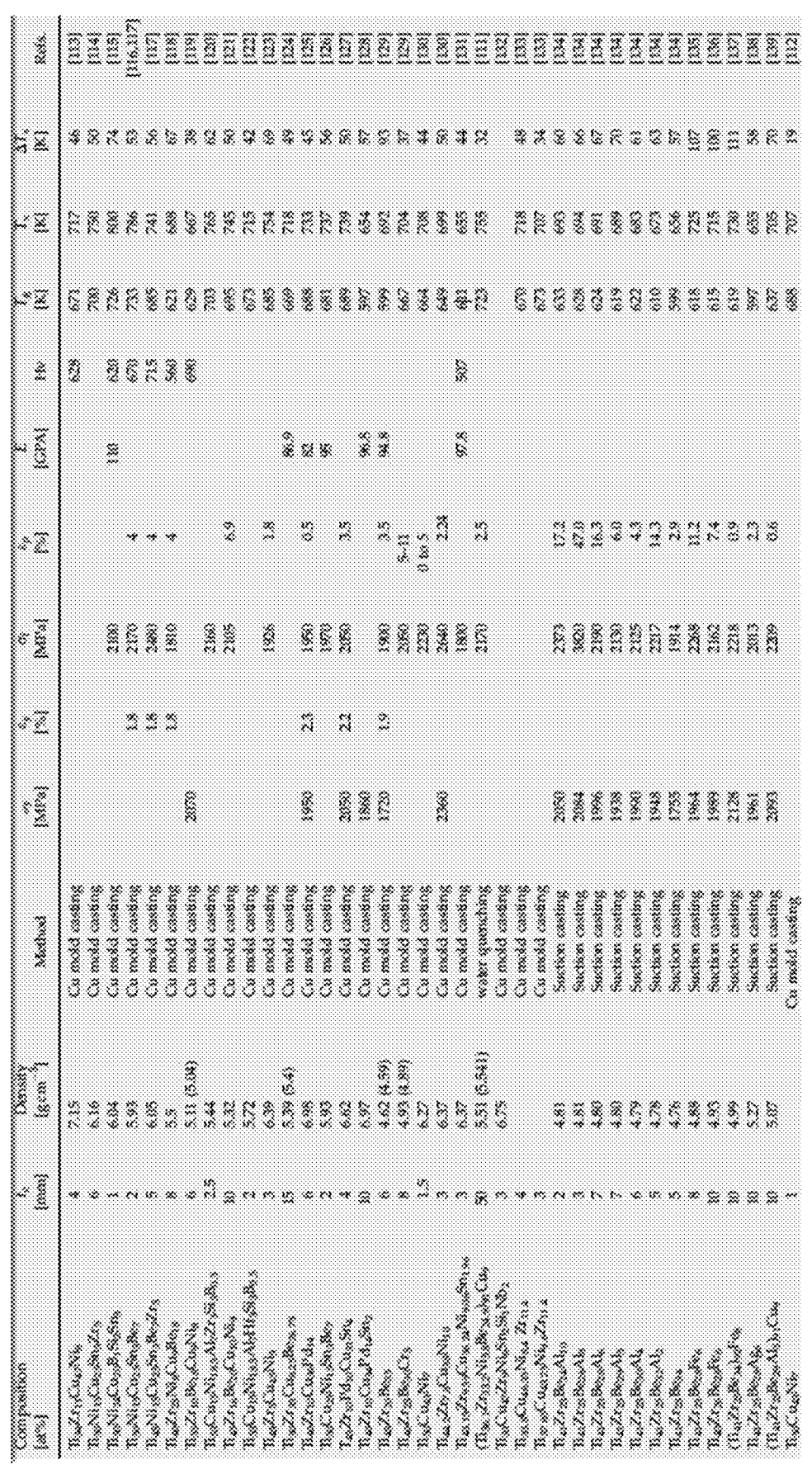

Furthermore, in many embodiments, the BMG powder for 3D manufacturing of tough parts according to the methods of the application is selected such that if it were to be 3D printed as a monolithic part, the resulting BMG would be able to exhibit a notch toughness of at least 40 MPa m$^{1/2}$. In some such embodiments, the BMG powder with such characteristics may help ensure that the critical shear band spacing in the BMGMC material 3D printed according to the methods of the application is large enough to interact with the particles prior to printing. In many embodiments, the BMG powder alloy composition is selected from, for example, the Tables provided in FIGS. 14A through 14C. In many embodiments, the selected BMG powder may then be used to form the high strength matrix of the BMGMC alloys of the application.

In many embodiments, the BMG powder selected according to the criteria described above is next blended with one or more soft crystalline powders. In many embodiments, the added powder forms the reinforcing phase of the BMGMC alloys of the application. In many embodiments the added powder (or powders) is selected from the list: crystalline metal powder, amorphous metal powder, any combination thereof. In many embodiments, the powder particle size of the added powder is within 20% of the powder particle size of the matrix's BMG powder. In many embodiments, in addition to matching the particle size of the blended powders, the density of the blended alloys is also closely matched (e.g., within 20%). In many embodiments, such powder particle size or particle size and density agreements between the blended powders ensures the prevention of sedimentation during the mixing or printing of the feedstock. In addition, in many embodiments, the absolute powder particle size is between 20-200 micron in diameter. In many such embodiments, the powder particle size of between 20-200 micron in diameter ensures that the particles are large enough to match the length scale of the BMGMC deformation and, therefore, provide the maximum composite reinforcement benefit to the BMG matrix (as explained by Hofmann et. al. in Nature 2007, the disclosures of which are incorporated herein by reference). Finally, in many embodiments, the volume fraction of the added reinforcement powder is between 15% and 95% of the alloy. In many such embodiments, the presence of more than 15% of the reinforcement additives by volume ensures sufficient distance between the dendrites to effectively stop cracks. Concurrently, maintaining the volume fraction of the reinforcement additives below 95% ensures sufficient BMG matrix contribution to the alloy's strength. This is, of course, only possible if the BMG matrix exhibits a lower melting temperature than the reinforcing particles such that a matrix forms during additive manufacturing so as to prevent percolation of the softer phase through the part.

In accordance with embodiments of the invention the bulk metallic glass matrix composites made in accordance with the embodiments described herein may have a number of physical properties that are improved over conventional composites, including, a porosity of equal to or less than 2% by volume, an overall strength of at least 50% of the strength of the bulk metallic glass composition when formed into a bulk part, a fracture toughness that is at least 5% larger than bulk metallic glass composition, a tension ductility that is at least 1% larger than the bulk metallic glass composition, a notch toughness larger than 40 MPa m$^{1/2}$ in some cases larger than 80 MPa m$^{1/2}$ and in some cases larger than 100 MPa m$^{1/2}$ when measured in a part formed from a bulk metallic glass composition with a notch radius of 100 micrometers, a strength of greater than 1 GPa and in some instances greater than 1.2 GPa, a ductility in tension of greater than 4%.

Embodiments of Methods for Additive Manufacturing of BMGMC Parts

As discussed above, embodiments of BMGMC materials incorporate high volume fractions of soft inclusions, however, as found by prior art studies an increased inclusion volume fraction also makes the alloys more viscous and significantly raises their melting temperature, especially upon exclusion of Be additives, making them more difficult to cast. Recently, metal additive manufacturing (AM) technology (also known as 3D printing) has made rapid advances in the fabrication of net-shaped parts from novel metal alloys. Typically, metal AM has been used to fabricate components from conventional crystalline metal alloys, such as titanium, steel, casting aluminum alloys, and Inconel. However, the rapid cooling rates inherent to many AM technologies have also allowed for the fabrication of metastable alloys, such as bulk metallic glasses (BMGs) and nanocrystalline metals. Specifically, cooling rates in excess of $10^3$ K s$^{-1}$ for each deposited layer have allowed thick, net-shaped components to be printed from alloys that have microstructures (or lack thereof) that cannot be cast or otherwise manufactured in bulk form.

Figure 15A:
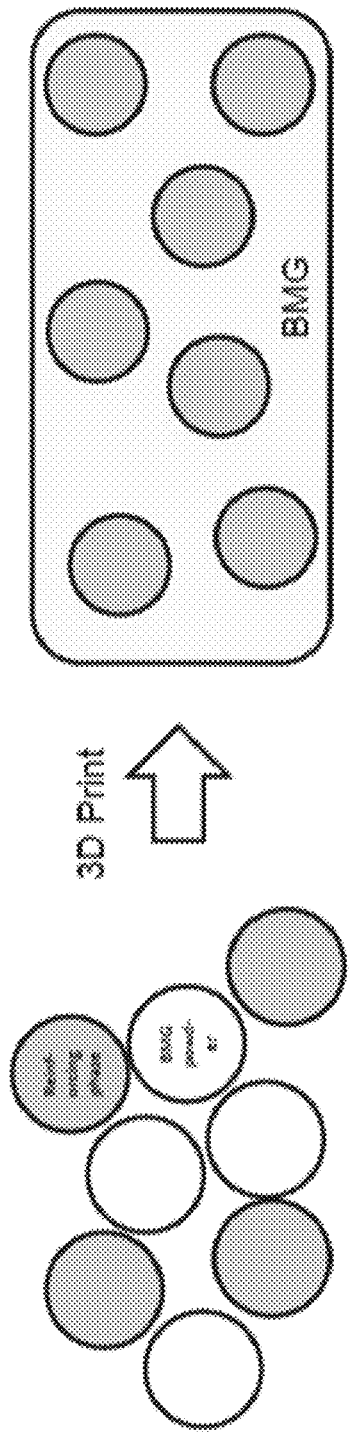
FIGS. 15A and 15B provide schematics of methods of forming BMGMCs in accordance with embodiments.

As discussed above, AM processes have typically not been used in the manufacture of objects from BMGMCs, because the best properties have been achieved by creating equilibrium composites where dendrites are in thermal equilibrium with the glass forming BMG liquid and their size is controlled through semi-solid processing. With additive manufacturing, there is no way to do semi-solid processing due to the rapid heating and cooling process. In many embodiments, additive manufacturing processes are used to form both BMGMC materials and objects therefrom. Schematics of such embodiments are provided in FIGS. 15A and 15B. As shown, in many embodiments, first, a BMG powder suitable for use with a powder utilizing metal additive manufacturing processes is selected. In many embodiments, the powder utilizing metal additive manufacturing processes of interest may include one of: powder bed fusion, direct metal laser sintering, direct energy deposition, laser engineered net shaping, thermal spray additive manufacturing, or another powder utilizing process. In many embodiments, the BMG powder selected according to the criteria described above is next blended with one or more soft crystalline powders. In many embodiments, the added powder forms the reinforcing (dendrite) phase of the BMGMC alloys of the application. In many embodiments the added powder (or powders) is selected from the list: crystalline metal powder, amorphous metal powder, any combination thereof. (This process is summarized in FIG. 15A.) Once the BMGMC material is formed it can be deposited layer by layer using an additive manufacturing process, such as, for example, powder bed fusion, direct metal laser sintering, direct energy deposition, laser engineered net shaping, thermal spray additive manufacturing, or another powder utilizing process. (This process is summarized in FIG. 15B.)

Figure 15B:
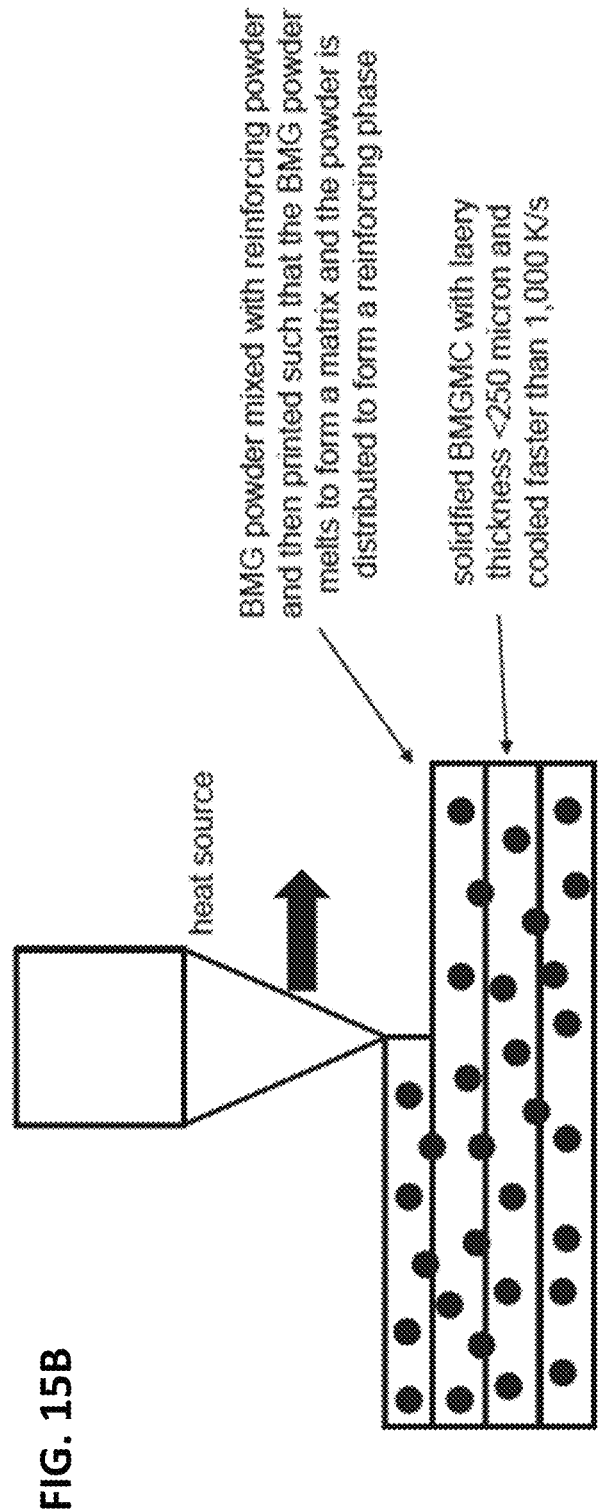

It will be understood that parameters for the fabrication of BMGMC parts from the powdered feedstock selected according to the methods of the application are adjusted according to the methods described herein to ensure the proper alloy microstructure and, accordingly, enhanced toughness and ductility. In many such embodiments, the heating source of the additive manufacturing set-up is adjusted to accommodate the proper heating/melting of the heat sensitive BMG powders. As such, in some embodiments, the additive manufacturing process of the application takes advantage of the lower melting temperature of the BMGs as compared to the melting temperature of the crystalline powder inclusions; while in other embodiments the process uses a more rapid sweep of the heating means to take advantage of the differential coupling with the laser heating source. Furthermore, in many embodiments, the heating source of the additive manufacturing process may be adjusted to ensure that, upon melting followed by solidification, the BMG powder forms a solid composite matrix with less than 2% porosity. Since BMGs cannot be heat treated to remove porosity post-production (due to the heat sensitivity of the amorphous phase), it is critically important for the overall toughness of the 3D printed BMGMCs of the application to maintain their full density during the fabrication process. In many embodiments, the thickness of each deposited BMGMC layer is <250 micron, wherein each layer is cooled faster than 100 K/s, and in some embodiments faster than 1,000 K/s (FIG. 15B). The presence of the reinforcing phase may actually assist in the formation of higher density parts through printing by providing an interface for the molten melt to wet against, preventing cavitation. The particles may also assist in the cooling rate of the molten BMG matrix upon solidification by accumulating heat during cooling away from the matrix, allowing it more easily to form a glass. This is due to the higher thermal conductivity and heat capacity of the crystalline phase as opposed to the glassy phase.

Furthermore, in many embodiments, the additive manufacturing methods of the application ensure that the inclusion crystalline particles are homogenously distributed throughout the BMG matrix of the composite. In many embodiments, the particles of the additive reinforcement powders do not fully dissolve into the BMG matrix during the printing process, but retain at least 90% of their pre-print volume. Since BMG alloys typically have a much lower melting temperature than crystalline alloys, the BMG may be melted without significantly melting the reinforcement powder. However, in many embodiments based on laser-based 3D printing systems, multiple passes of the laser over one layer of the part may be used to consolidate the BMG matrix, while also partially dissolving the reinforcement powder until the optimal properties are achieved. In other embodiments, different heating methods may be used to preferentially melt the BMG powder, with only minor/partial melting of the reinforcement dendrite powders. Accordingly, the BMGMC alloys additively manufactured ex situ from a feedstock of blended powders, according to the embodiments of the application, achieve the high toughness and ductility of the in situ formed BMGMCs, wherein the BMG matrix is responsible for the alloy's strength, while the reinforcing crystalline inclusions (i.e. the second phase) provide the toughening mechanism by inhibiting any crack propagation originating from the matrix. As such, in many embodiments, it is equally important for the BMGMCs of the application to have a sufficiently tough BMG matrix to prevent the crack formation in the regions between the particle inclusions, and a sufficient concentration of the inclusions to block the crack propagation if the matrix cracks do occur, as described above.

The additive manufacturing methods of the application ensure that there is a strong interface between the dendrite inclusion and matrix phases in the BMGMC alloys of the application. More specifically, in many embodiments, precautions are taken to ensure that the toughness of the interfacial zone between each of the inclusions and the BMG matrix is sufficiently high to prevent any occurring crack from traversing the edge of the particle phase without deforming it (as described in Ritchie, Hofmann, Applied Physics Letters 2009, the disclosures of which are incorporated herein by reference). For example, in many embodiments, precautions are taken to remove or at least partially reduce the thickness of the brittle oxide layer (that typically forms on the BMG surfaces) from the BMG powder particles during the additive manufacturing process. To this end, in many embodiments, the BMG powder particles are partially melted during the additive manufacturing process to dissolve the surface passivating oxide layer and, thus, ensure the sufficiently tough matrix-dendrite interface and overall enhanced material toughness. In contrast, failure to at least partially dissolve the BMG surface oxide will most likely result in loss of the overall material toughness because the cracks originating in the matrix will be able to escape the dampening effect of the dendrite inclusions via the brittle oxide matrix-dendrite interface pathways. In addition, in many embodiments, the original powder selection process ensures the chemical compatibility between the reinforcement and matrix phases, such that a small amount of surface oxide and dendrite components dissolved in the matrix during manufacturing do not compromise the toughness or glass formation of the solidified BMG matrix.

In other embodiments, the particle is designed so that when partially dissolved in the BMG matrix during processing, the extra metal added to the matrix does not detrimentally effect its glass forming ability, and may actually enhance it. This could be accomplished by creating a BMG powder slightly depleted in elements that would optimize its glass formation and then have those elements returned by partially dissolving the reinforcing particles to a known extent. In a further embodiment, partially dissolving the reinforcing particles may create small dendrites in the matrix upon solidification, which may provide an additional reinforcing phase. The final printed composite could then be comprised of a glass matrix, large reinforcing particles, and small dendrites that have phase separated from the glass during solidification.

Using the methods according to embodiments bulk metallic glass matrix composite parts may be printed. In such embodiments, the volume fraction of the at least one additional metallic composition may be varied throughout the solidified bulk metallic glass matrix composite. The final part may be formed net-shape or may be machined or finished to smooth the surface thereof. Although the layer-by-layer deposition may be applied to other metallic glasses, in some embodiments they be applied to a crystalline metal surface. The methods may be used to form any suitable object including, for example, watches, jewelry, electronic cases, structural components, gears, and kinetic rounds.

EXEMPLARY EMBODIMENTS

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Celsius, and pressure is at or near atmospheric.

Example 1. Improving Mechanical Properties of Zr-Based BMG Alloys

An example of additive manufacturing (via SLM) with monolithic BMG-affording $Zr_{52.5}Ti_5Cu_{17.9}Ni_{14.6}Al_{10}$, was reported by Li et. al. in Materials and Design 112 (2016) 217-226, the disclosure of which are incorporated herein by reference. The data from the accompanying compression tests reported by Li show that the resulting additively manufactured BMG parts are brittle. However, the Zi-based alloy employed by Li is a good glass former not containing Be, with a composition similar to the ones provided in the table of FIG. 14A, and, therefore, represents an alloy suitable for the additive manufacturing methods of the application. Accordingly, in many embodiments, the plasticity, and, therefore, toughness, of the parts fabricated from $Zr_{52.5}Ti_5Cu_{17.9}Ni_{14.6}Al_{10}$ can be greatly improved with in situ or ex situ addition of a reinforcing dendrite phase during 3D printing, according to the methods of the application.

Example 2. Improving Mechanical Properties of Fe-Based BMG Alloys

Similarly to Example 1, inexpensive monolithic BMG parts have been previously additively manufactured (also via selective laser melting) from Fe-based BMG alloys, such as $Fe_{74}Mo_4P_{10}C_{7.5}B_{2.5}Si_2$, as reported, for example, in Simon Pauly, et al., Materials Today, Vol. 16, Numbers 1/2, (2013), p. 37-41; and Hyo Yun Jung, et al., Materials & Design, Vol. 86 (2015), p. 703-708, the disclosures of which are incorporated herein by reference, these parts proved to be brittle, as expected from monolithic BMGs. However, in many embodiments, the fracture toughness and ductility of $Fe_{74}Mo_4P_{10}C_{7.5}B_{2.5}Si_2$ or similar alloys can be improved with in situ or ex situ addition of a reinforcing dendrite phase during 3D printing, according to the methods of the application.

DOCTRINE OF EQUIVALENTS

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method for forming a bulk metallic glass matrix composite utilizing powder-based additive manufacturing comprising:
    mixing a powder of a bulk metallic glass composition with a powder of at least one additional metallic composition to form a mixed powder wherein the at least one additional metallic composition forms a ductile reinforcing metallic crystalline phase configured to inhibit crack propagation in a bulk metallic glass matrix formed from the bulk metallic glass composition, and wherein a volume fraction of the at least one metallic crystalline phase is from between 15-95% by volume of the bulk metallic glass matrix composite;
    melting the mixed powder of the bulk metallic glass composition and the at least one additional metallic composition to form a melt using an additive manufacturing heating source such that the at least one additional metallic composition is partially melted such that a native oxide layer disposed within the bulk metallic glass matrix is dissolved; and
    solidifying the melt formed from the mixed powder in a layer by layer printing process to form the bulk metallic glass matrix composite having at least one property selected from a group consisting of a porosity of equal to or less than 2% by volume, an overall strength of at least 50% of the strength of the bulk metallic glass composition when formed into a bulk part, a fracture toughness that is at least 5% larger than bulk metallic glass composition, a tension ductility that is at least 1% larger than the bulk metallic glass composition, and a notch toughness larger than 40 MPa m$^{1/2}$ when measured in a part formed from a bulk metallic glass composition with a notch radius of 100 micrometers.

2. The method of claim 1 wherein the layer by layer printing process is selected from a group consisting of powder bed fusion, selective laser melting, direct metal laser sintering, direct energy deposition, electron beam fabrication, thermal spray additive manufacturing, cold spray additive manufacturing and binder jetting.

3. The method of claim 1, where the powder of the bulk metallic glass composition and the powder of the at least one additional metallic composition are mixed before solidification.

4. The method of claim 3, where a particle size of the bulk metallic glass composition is within 20% of a particle size of the powder of the at least one additional metallic composition.

5. The method of claim 1, where the bulk metallic glass matrix composite when solidified has a strength of greater than 1 GPa.

6. The method of claim 1, where the bulk metallic glass matrix composite when solidified has a ductility in tension of greater than 4%.

7. The method of claim 1, where the fracture toughness of the bulk metallic glass matrix composite when solidified exceeds 80 MPa m$^{1/2}$.

8. The method of claim 1, where the at least one additional metallic composition does not substantially alter a glass forming ability of the bulk metallic glass composition.

9. The method of claim 1, further comprising machining or finishing the solidified bulk metallic glass matrix composite to smooth a surface thereof.

10. The method of claim 1, where the bulk metallic glass matrix composite is applied to a crystalline metal surface.

11. The method of claim 1, where the hardness of the at least one additional metallic composition is at least 5% lower than the hardness of the bulk metallic glass composition.

12. The method of claim 1, where the shear modulus of the at least one additional metallic composition is lower than the shear modulus of the bulk metallic glass composition.

13. The method of claim 1, where the stiffness of the at least one additional metallic composition is lower than the stiffness of the bulk metallic glass composition.

14. The method of claim 1, where the at least one additional metallic composition is a crystalline metal that exhibits greater than 5% ductility in tension as a monolithic part.

15. The method of claim 1, where a common metal element comprises the largest concentration of both the at least one additional metallic and the bulk metallic glass composition.

16. The method of claim 1, where the bulk metallic glass composition is selected such that its most abundant metal is selected from a group of Ti, Zr, Hf, Fe, Co, Ni, Pd, Pt, Cu, Ag, Au, and Al.

17. The method of claim 1, where the bulk metallic glass composition comprises Zr—Cu—Al.

18. The method of claim 1, where the bulk metallic glass composition is a Ti-based metallic glass with a density of less than 5.5 g/cm$^3$.

19. The method of claim 1, where the bulk metallic glass composition is Zr-based and the at least one additional metallic composition is Ti or Zr based alloyed with one or more of V, Nb, Ta, Mo or Fe.

20. The method of claim 1, where the bulk metallic glass matrix composite may comprise one composition feature from a group consisting of is based on Ti and has a density of less than 6 g/cm$^3$, is based on Ti and the at least one additional metallic composition is based on Ti and is based on Fe and the at least one additional metallic composition is based on Fe.

* * * * *